United States Patent
Brady et al.

(10) Patent No.: US 12,326,119 B2
(45) Date of Patent: Jun. 10, 2025

(54) METHODS AND APPARATUS TO PRODUCE HYDROGEN GAS TURBINE PROPULSION

(71) Applicants: General Electric Company, Schenectady, NY (US); GE AVIO S.R.L., Rivalta di Torino (IT)

(72) Inventors: David Justin Brady, Lynn, MA (US); Mirko Gernone, Bari (IT); Nathan E. Gibson, Evendale, OH (US)

(73) Assignees: General Electric Company, Evendale, OH (US); GE AVIO S.R.L., Rivalta di Torino (IT)

( * ) Notice: Subject to any disclaimer, the term of this patent is extended or adjusted under 35 U.S.C. 154(b) by 0 days.

(21) Appl. No.: 18/592,194

(22) Filed: Feb. 29, 2024

(65) Prior Publication Data

US 2024/0200497 A1    Jun. 20, 2024

Related U.S. Application Data

(63) Continuation of application No. 17/678,824, filed on Feb. 23, 2022, now Pat. No. 11,946,419.

(51) Int. Cl.
*F02C 7/224* (2006.01)
*B64D 37/32* (2006.01)
*F02C 3/22* (2006.01)
*F02C 3/30* (2006.01)

(52) U.S. Cl.
CPC .............. *F02C 7/224* (2013.01); *B64D 37/32* (2013.01); *F02C 3/22* (2013.01); *F02C 3/30* (2013.01); *F05D 2260/213* (2013.01); *F05D 2260/607* (2013.01); *F05D 2260/99* (2013.01)

(58) Field of Classification Search
CPC .... F02C 3/20; F02C 3/22; F02C 7/224; F02C 9/40; B64D 37/30; B64D 37/34; F05D 2240/36
See application file for complete search history.

(56) References Cited

U.S. PATENT DOCUMENTS

| | | |
|---|---|---|
| 2,984,978 A | 5/1961 | Griffith |
| 3,241,311 A | 3/1966 | Kuhrt |
| 5,832,718 A | 11/1998 | Suttrop |

(Continued)

FOREIGN PATENT DOCUMENTS

| | | | |
|---|---|---|---|
| EP | 4063275 A2 | 9/2022 | |
| JP | 2019210975 A | * 12/2019 | ............... C01B 3/00 |
| WO | 2015052473 A1 | 4/2015 | |

OTHER PUBLICATIONS

European Patent Office, "Extended European Search Report," issued in connection with European Application No. 22210663.5, issued on Jul. 13, 2023, 7 pages.

(Continued)

*Primary Examiner* — Alain Chau
(74) *Attorney, Agent, or Firm* — Hanley, Flight & Zimmerman, LLC

(57) ABSTRACT

Methods and apparatus to produce hydrogen gas turbine propulsion are disclosed. An example apparatus to produce propulsion in a gas turbine engine includes a fluid line to transport hydrogen from a hydrogen supply and an inert gas from an inert gas supply to a gas turbine combustor. The apparatus also includes at least one heat exchanger coupled to the fluid line to heat the inert gas and the hydrogen in the fluid line.

20 Claims, 8 Drawing Sheets

(56) References Cited

U.S. PATENT DOCUMENTS

| | | | |
|---|---|---|---|
| 6,263,678 B1 | 7/2001 | Suttrop | |
| 7,117,663 B2 | 10/2006 | Knapp | |
| 8,196,862 B2* | 6/2012 | Brooks | F02C 7/224 |
| | | | 123/563 |
| 8,490,917 B2* | 7/2013 | Brooks | F02B 29/0412 |
| | | | 123/563 |
| 9,422,889 B2 | 8/2016 | Conrardy | |
| 10,400,676 B2 | 9/2019 | Ribarov | |
| 10,995,913 B2 | 5/2021 | Fujita | |
| 11,542,869 B2* | 1/2023 | Smith | F02C 7/22 |
| 11,542,870 B1 | 1/2023 | Rambo | |
| 11,668,243 B2* | 6/2023 | Muldoon | F02C 7/262 |
| | | | 60/736 |
| 11,760,502 B2* | 9/2023 | Palmer | F02C 7/232 |
| | | | 60/39.281 |
| 11,761,381 B2* | 9/2023 | Smith | F02C 9/28 |
| | | | 60/736 |
| 11,970,975 B2* | 4/2024 | Palmer | F02C 7/22 |
| 2010/0192890 A1* | 8/2010 | Brooks | F02C 7/143 |
| | | | 123/557 |
| 2012/0156059 A1* | 6/2012 | Watts | B64D 37/30 |
| | | | 417/208 |
| 2015/0000298 A1 | 1/2015 | McAlister | |
| 2015/0101308 A1 | 4/2015 | Bond | |
| 2015/0275755 A1* | 10/2015 | Ogata | F23R 3/286 |
| | | | 60/737 |
| 2017/0254270 A1 | 9/2017 | Okada | |
| 2019/0293024 A1 | 9/2019 | Carter | |
| 2019/0368426 A1* | 12/2019 | Kanei | F02C 6/00 |
| 2020/0088099 A1 | 3/2020 | Roberge | |
| 2022/0099020 A1* | 3/2022 | Palmer | F02C 7/04 |
| 2022/0145801 A1 | 5/2022 | Mccurdy Gibson | |
| 2022/0306310 A1 | 9/2022 | Sibbach | |
| 2022/0325668 A1 | 10/2022 | Wong | |
| 2022/0341546 A1* | 10/2022 | Jung | H01M 8/04007 |
| 2022/0381183 A1* | 12/2022 | Smith | F02C 3/20 |
| 2022/0381185 A1 | 12/2022 | Muldoon | |
| 2023/0015930 A1 | 1/2023 | Meshkin Fam | |
| 2023/0018918 A1 | 1/2023 | Dillon | |
| 2023/0045911 A1* | 2/2023 | Smith | F02C 3/22 |
| 2023/0092811 A1* | 3/2023 | Palmer | F02C 3/22 |
| | | | 60/39.281 |

OTHER PUBLICATIONS

United States Patent and Trademark Office, "Non-Final Office Action," issued in connection with U.S. Appl. No. 17/678,824, dated Mar. 2, 2023, 16 pages.

United States Patent and Trademark Office, "Final Office Action," issued in connection with U.S. Appl. No. 17/678,824, dated Sep. 7, 2023, 12 pages.

United States Patent and Trademark Office, "Notice of Allowance and Fee(s) Due," issued in connection with U.S. Appl. No. 17/678,824, dated Nov. 27, 2023, 13 pages.

* cited by examiner

METHODS AND APPARATUS TO PRODUCE HYDROGEN GAS TURBINE PROPULSION

RELATED APPLICATION

This patent arises from a continuation of U.S. patent application Ser. No. 17/678,824 (now U.S. Pat. No. 11,946, 419), which was filed on Feb. 23, 2022. U.S. patent application Ser. No. 17/678,824 is hereby incorporated herein by reference in its entirety. Priority to U.S. patent application Ser. No. 17/678,824 is hereby claimed.

FIELD OF THE DISCLOSURE

This disclosure relates generally to gas turbine engines and, more particularly, to methods and apparatus to produce hydrogen gas turbine propulsion.

BACKGROUND

In recent years, gas turbine engines have utilized mixtures of hydrogen gas and conventional fuels because of the advantages hydrogen gas provides. Specifically, hydrogen is an abundantly available element that has beneficial properties for combustion in gas turbine engines, such as reduced carbon emissions, lower fuel consumption (pounds per hour (pph)), greater energy production, light weight, and high combustion rate and temperature. During combustion of the mixture of hydrogen gas and conventional fuels, chemical energy and thermal energy are converted into mechanical energy. The mechanical energy produced as a result of the combustion can drive downstream turbine blades and provide propulsion to an aircraft or drive a shaft of a generator that produces electric current.

BRIEF DESCRIPTION OF THE DRAWINGS

The figures are not to scale. In general, the same reference numbers will be used throughout the drawing(s) and accompanying written description to refer to the same or like parts.

DETAILED DESCRIPTION

Figure 1:
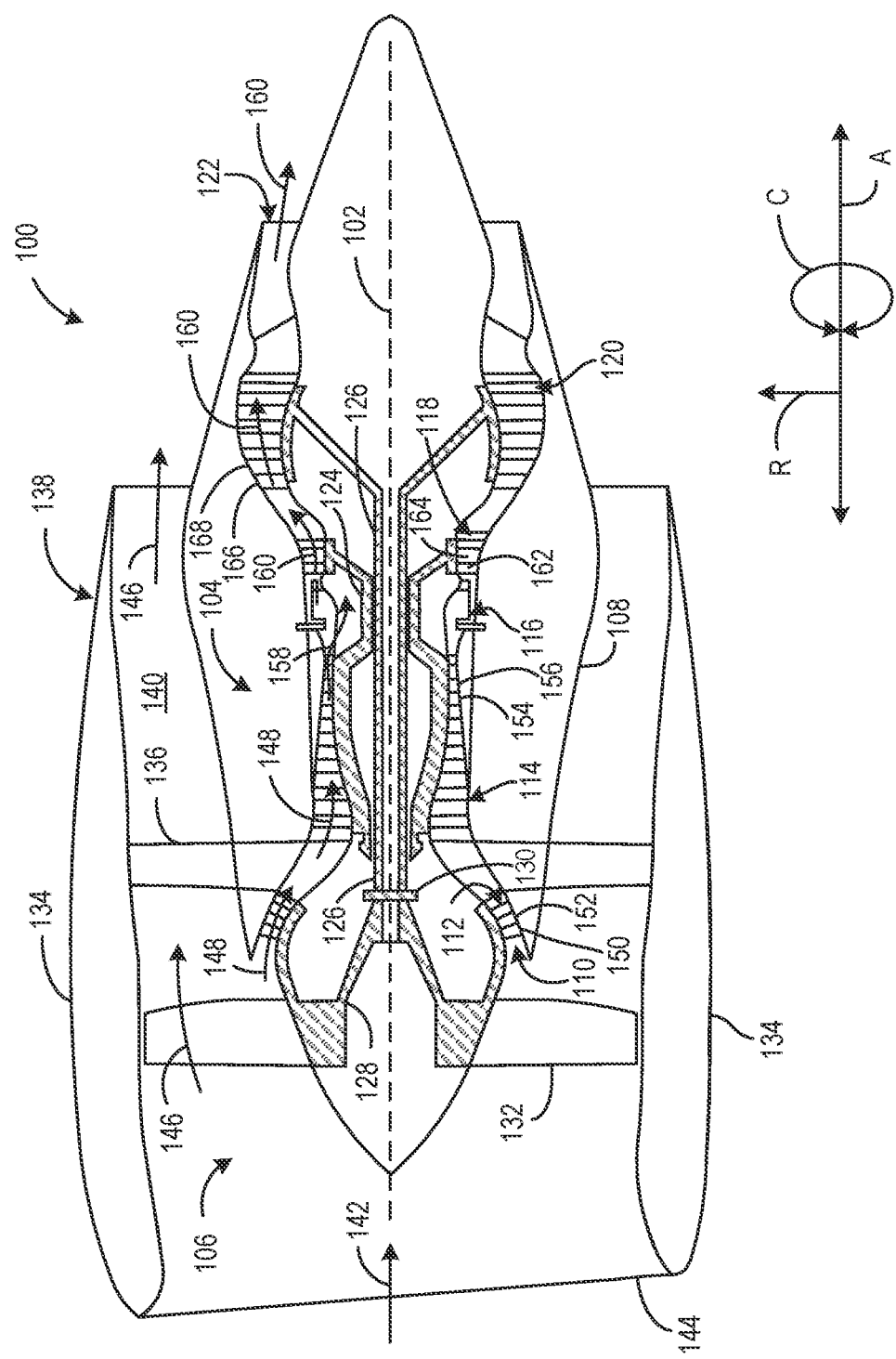
FIG. 1 illustrates a schematic cross-sectional view of a prior art example of a turbofan engine.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events. As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a ten percent margin.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to a flow in a pathway. For example, with respect to a fluid flow, "upstream" refers to the direction from which the fluid flows, and "downstream" refers to the direction to which the fluid flows.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

Hydrogen is an abundant fuel source that has additional beneficial properties for combustion in gas turbine engines, such as a high combustion rate and temperature, which can increase an efficiency of the gas turbine engine. Gas turbine engines produce power and/or mechanical drive for aeronautics, marine applications, gear boxes, off-shore power generators, terrestrial power plants, etc. Gas turbine engines can utilize hydrogen gas in addition to other conventional fuels to convert thermal and chemical energy to mechanical energy via combustion. Specifically, a gas turbine engine that utilizes hydrogen gas during combustion can incrementally increase a quantity of energy produced compared to a conventional gas turbine engine that does not utilize hydrogen gas. Further, utilizing hydrogen gas within gas turbine engines reduces harmful carbon emissions, which is a focus of power producers given the emission regulations that have been implemented by legislation.

However, utilizing hydrogen as fuel presents unique challenges compared to the utilization of conventional hydrocarbons. Specifically, the relatively high combustion temperature and flame propagation speed associated with hydrogen can cause a nozzle that injects the hydrogen to overheat resulting in deformation. Additionally, the high flame temperature and propagation speed can increase the risk of combustion flashback and/or flame holding occurring in the system. Moreover, combustion flashback and/or flame holding can cause potential deflagration combustion, which presents a catastrophic risk to operators. Accordingly, the risks that result from utilizing hydrogen in combustion have limited the implementation of hydrogen as fuel in gas turbine engines.

In known implementations, water is utilized with hydrogen gas to prevent the hydrogen gas from overheating a combustor nozzle(s) upon ignition. For instance, multiple nozzles can be utilized to induce water with hydrogen gas into the combustor. In some instances, a nozzle that induces fuel into the combustor includes a chamber for mixing the fuel with water vapor before the fuel is injected into the combustor. However, water reduces an efficiency of the combustion and, thus, mitigates some of the advantages provided by the utilization of hydrogen.

In some other known implementations, hydrogen is only utilized as a portion of the fuel for combustion and/or only within certain operational limits associated with the gas turbine engine. In some instances, hydrocarbon fuel is supplied to a combustor at all power operations of the gas turbine engine while hydrogen gas is induced at low-power operations and terminated at mid-power and high-power operations. In some examples, hydrogen fuel is utilized in a fuel blend in combination with liquefaction gas, natural gas, and/or coal gas. In some examples, hydrogen fuel accounts for up to 75% of the fuel blend at predetermined power operations. However, limiting the utilization of hydrogen reduces the benefits that hydrogen provides while still encountering the risk combustion flashback, flame holding, and/or deterioration in the gas turbine engine.

Example methods and apparatus to produce hydrogen turbine propulsion in a gas turbine engine are disclosed herein. An example fuel circuit disclosed herein transports hydrogen from a cryogenic hydrogen supply to a gas turbine combustor. The utilization of cryogenic hydrogen prevents the hydrogen from overheating during an operation of the gas turbine engine. To increase a temperature of the cryogenic hydrogen to enable the hydrogen to be combustible (e.g., to satisfy a temperature threshold associated with a combustion temperature of hydrogen) in advance of being injected into the gas turbine combustor, at least one heat exchanger (e.g., at least one trim vaporizer) is coupled to the fluid line to warm the cryogenic hydrogen in the circuit.

Given that the cryogenic hydrogen will freeze or crystallize any residual substances, such as moisture, in the fuel circuit, the at least one heat exchanger activates in advance of the hydrogen being induced into a portion of the fuel circuit. Further, to remove the residual substances from the fuel circuit as well as any leftover hydrogen that could present a risk of combustion flashback or flame holding to the fuel circuit, the fuel circuit transports an inert gas (e.g., nitrogen, helium, etc.) therethrough to purge the fuel circuit of non-inert substances. Specifically, during a startup and/or shutdown operation, the at least one heat exchanger primes the fuel circuit for the inert gas by increasing a temperature of the fuel circuit above a liquefication temperature associated with the inert gas. In turn, the inert gas is injected through the fuel circuit to remove any residual hydrogen and/or humidity from the fuel circuit. In some examples, the at least one heat exchanger warms the inert gas to a temperature above the liquefication temperature associated therewith such that the inert gas can warm colder areas of the fuel circuit in response to flowing therethrough.

In response to the inert gas purging the fuel circuit, gaseous hydrogen is transported through the fuel circuit from a hydrogen source separate from the cryogenic hydrogen supply. Specifically, the at least one heat exchanger warms a blend of the gaseous hydrogen and the inert gas as the blend flows through the fuel circuit. To help ensure safe combustion of the gaseous hydrogen in the combustor, a flow rate of the blend is increased to satisfy a volumetric flow rate threshold or a mass flow rate threshold, and a temperature of the blend is increased to satisfy a temperature threshold. Specifically, to prevent an ignition of the gaseous hydrogen in the combustor from damaging one or more nozzles injecting the blend, the volumetric flow rate of the blend is increased to separate the combusting hydrogen particles from a tip(s) of the nozzle(s) and, thus, reduce a temperature encountered by the tip(s) of the nozzle(s) in response to the combustion of the hydrogen particles. In some examples, when the volumetric flow rate of the blend does not satisfy (e.g., is less than) the volumetric flow rate threshold, a volume of the gaseous hydrogen and/or the inert gas being injected into the fuel circuit is increased to increase the volumetric flow rate of the blend exiting the nozzle(s). Moreover, the temperature threshold is associated with a temperature that enables the hydrogen to combust in response to encountering a flame or spark.

In response to ignition in the combustor, a composition of the inert gas in the blend can be reduced as the gas turbine engine is brought up to speed (e.g., increases a power output). For example, the power output of the gas turbine engine can be compared to one or more power output thresholds that are associated with corresponding inert gas compositions.

Eventually, when the power output of the gas turbine engine satisfies a power output threshold, the gas turbine engine halts injections of the inert gas into the fuel circuit. For example, the gas turbine engine can close a valve to prevent the inert gas from entering the fuel circuit. When the inert gas is emptied from at least a portion of the fuel circuit, the gas turbine engine injects the cryogenic hydrogen into the fuel circuit. Specifically, the inert gas is cleared from at least the portion of the fuel circuit that encounters the hydrogen at cryogenic temperatures to prevent the inert gas from freezing in the fuel circuit. In turn, the heat exchanger(s) associated with the fuel circuit warm the hydrogen to a temperature sufficient for combustion as the hydrogen flows towards the combustor.

In certain examples, thermal energy radiating from the gas turbine engine can warm the fuel circuit and, thus, increase the temperature of the hydrogen to the associated combustion temperature. Accordingly, the heat exchanger(s) can be de-activated in response to the gas turbine engine radiating enough thermal energy to warm the hydrogen to the associated combustion temperature. For example, the heat exchanger(s) can be de-activated in response to a temperature of a portion of the gas turbine engine satisfying a temperature threshold. Additionally or alternatively, the heat exchanger(s) can be de-activated in response to a power output of the gas turbine engine satisfying a threshold power output that corresponds with the gas turbine engine providing thermal energy to the fuel circuit such that the temperature of the hydrogen increases to at least the associated combustion temperature. Similarly, the heat exchanger(s) can be de-activated in response to the gas turbine engine operating at or above the threshold power output for at least a threshold period of time. Advantageously, the de-activation of the heat exchanger(s) and the utilization of the cryogenic hydrogen prevents the hydrogen from overheating and damaging the nozzle(s). Moreover, the hydrogen can prevent the gas turbine engine from overheating by absorbing thermal energy from the gas turbine engine.

To shut down the gas turbine engine, the heat exchanger(s) are re-activated to enable the portion of the fuel circuit that encountered the hydrogen at cryogenic temperatures to be warmed. Specifically, the temperature of the fuel circuit is increased to satisfy a temperature threshold associated with the liquification of the inert gas. In some examples, the gaseous hydrogen is re-injected such that the hydrogen is warmed via the heat exchanger(s) and flows through the portion of the fuel circuit that encountered the colder temperatures. As such, the gaseous hydrogen can warm the portion of the fuel circuit without freezing or crystallizing like the inert gas. In response to the temperature of the fuel circuit satisfying the temperature threshold corresponding to the liquefication temperature of the inert gas, the inert gas is injected into the fuel circuit and the injection of hydrogen is terminated. As a result, the inert gas can cause the hydrogen to move out of the fuel circuit to avoid or otherwise reduce risks associated with the hydrogen being left in the fuel circuit, such as deflagration combustion. In turn, one or more valves can be closed to trap the inert gas in the fuel circuit to maintain the safety of the fuel circuit in response the fuel circuit being cleared of hydrogen.

Referring now to the drawings, FIG. 1 is a schematic cross-sectional view of a prior art example of a turbofan engine 100 that may incorporate various examples disclosed herein. As shown in FIG. 1, the turbofan engine 100 defines a longitudinal or axial centerline axis 102 extending therethrough for reference. In general, the turbofan engine 100 can include a core turbine or a core turbine engine 104 disposed downstream from a fan section 106.

The core turbine engine 104 can generally include a substantially tubular outer casing 108 that defines an annular inlet 110. The outer casing 108 can be formed from multiple segments. The outer casing 108 encloses, in serial flow relationship, a compressor section having a booster or low-pressure compressor 112 ("LP compressor 112") and a high-pressure compressor 114 ("HP compressor 114"), a combustion section 116, a turbine section having a high-pressure turbine 118 ("HP turbine 118") and a low-pressure turbine 120 ("LP turbine 120"), and an exhaust section 122. A high-pressure shaft or spool 124 ("HP shaft 124") drivingly couples the HP turbine 118 and the HP compressor 114. A low-pressure shaft or spool 126 ("LP shaft 126") drivingly couples the LP turbine 120 and the LP compressor 112. The LP shaft 126 can also couple to a fan shaft or spool 128 of the fan section 106. In some examples, the LP shaft 126 can couple directly to the fan shaft 128 (i.e., a direct-drive configuration). In alternative configurations, the LP shaft 126 may couple to the fan shaft 128 via a reduction gearbox 130 (i.e., an indirect-drive or geared-drive configuration).

As shown in FIG. 1, the fan section 106 includes a plurality of fan blades 132 ("fan" 132) coupled to and extending radially outwardly from the fan shaft 128. An annular fan casing or nacelle 134 circumferentially encloses the fan section 106 and/or at least a portion of the core turbine engine 104. The nacelle 134 can be supported relative to the core turbine engine 104 by a forward mount 136. Furthermore, a downstream section 138 of the nacelle 134 can enclose an outer portion of the core turbine engine 104 to define a bypass airflow passage 140 therebetween.

As illustrated in FIG. 1, air 142 enters an intake or inlet portion 144 of the turbofan engine 100 during operation thereof. A first portion 146 of the air 142 flows into the bypass airflow passage 140, while a second portion 148 of the air 142 flows into the inlet 110 of the LP compressor 112. One or more sequential stages of LP compressor stator vanes 150 and LP compressor rotor blades 152 (e.g., turbine blades) coupled to the LP shaft 126 progressively compress the second portion 148 of the air 142 flowing through the LP compressor 112 en route to the HP compressor 114. Next, one or more sequential stages of HP compressor stator vanes 154 and HP compressor rotor blades 156 coupled to the HP shaft 124 further compress the second portion 148 of the air 142 flowing through the HP compressor 114. This provides compressed air 158 to the combustion section 116 where it mixes with fuel and burns to provide combustion gases 160. In FIG. 1, the turbofan engine 100 utilizes methane as fuel, which enables some of the difficulties associated with the utilization of hydrogen as fuel to be avoided, but other concerns arise and the overall performance of the turbofan engine 100 is reduced. For instance, a volumetric flow rate of the methane into the combustion section 116 is not a concern and, instead, the methane must be split into small enough particles for combustion. Moreover, the turbofan engine 100 has a reduced fuel efficiency as a result of utilizing methane as opposed to hydrogen.

In FIG. 1, the combustion gases 160 flow through the HP turbine 118 where one or more sequential stages of HP turbine stator vanes 162 and HP turbine rotor blades 164 coupled to the HP shaft 124 extract a first portion of kinetic and/or thermal energy therefrom. This energy extraction supports operation of the HP compressor 114. The combustion gases 160 then flow through the LP turbine 120 where one or more sequential stages of LP turbine stator vanes 166 and LP turbine rotor blades 168 coupled to the LP shaft 126 extract a second portion of thermal and/or kinetic energy therefrom. This energy extraction causes the LP shaft 126 to rotate, thereby supporting operation of the LP compressor 112 and/or rotation of the fan shaft 128. The combustion gases 160 then exit the core turbine 104 through the exhaust section 122 thereof.

Along with the turbofan engine 100, the core turbine 104 serves a similar purpose and sees a similar environment in land-based turbines, turbojet engines in which the ratio of the first portion 146 of the air 142 to the second portion 148 of the air 142 is less than that of a turbofan, and unducted fan engines in which the fan section 106 is devoid of the nacelle 134. In each of the turbofan, turbojet, and unducted engines, a speed reduction device (e.g., the reduction gearbox 130) can be included between any shafts and spools. For example, the reduction gearbox 130 can be disposed between the LP shaft 126 and the fan shaft 128 of the fan section 106.

As depicted therein, the turbofan engine 100 defines an axial direction A, a radial direction R, and a circumferential direction C. In general, the axial direction A extends generally parallel to the axial centerline axis 102, the radial direction R extends orthogonally outward from the axial centerline axis 102, and the circumferential direction C extends concentrically around the axial centerline axis 102.

Figure 2:
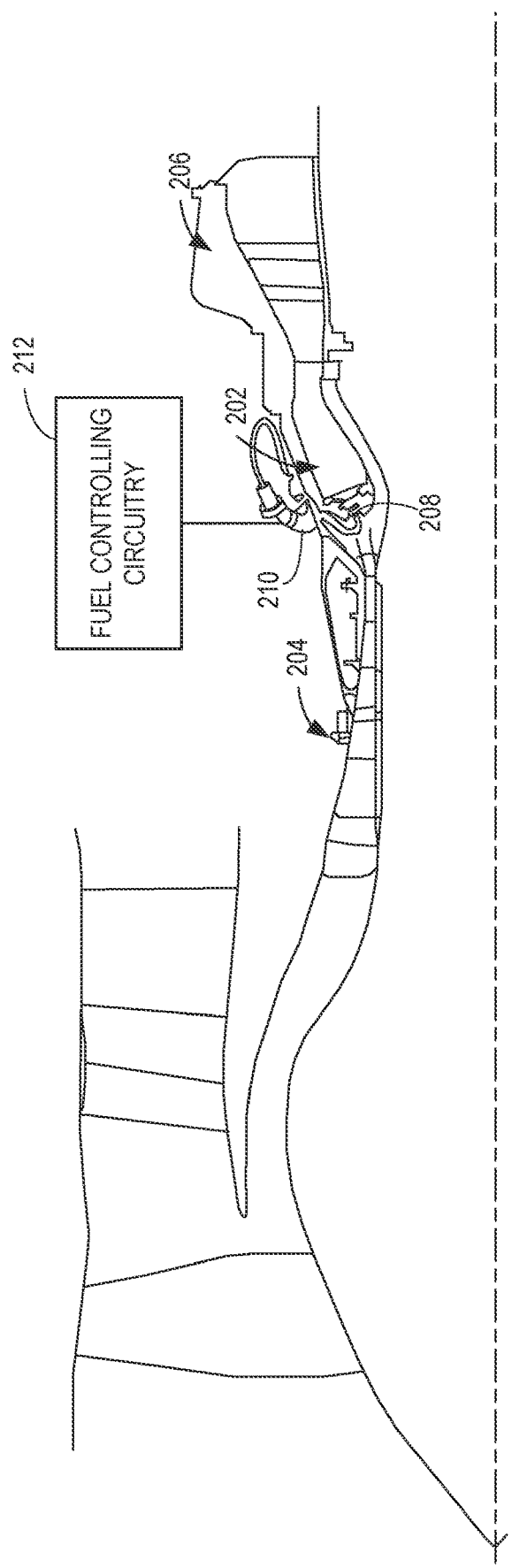
FIG. 2 illustrates a schematic cross-sectional view of an example turbofan engine in accordance with the teachings disclosed herein.

FIG. 2 illustrates a schematic cross-sectional view of an example turbofan engine 200 in accordance with the teachings disclosed herein. In FIG. 2, the turbofan engine 200 includes a combustor 202 between a compressor section 204 and a turbine section 206. In FIG. 2, the combustor 202 includes nozzles 208 in connection with a fuel circuit 210 (e.g., a fluid line, a fuel duct, etc.) that injects hydrogen and, at times, inert gas into the combustor 202, as discussed further in association with FIG. 3. In FIG. 2, the turbofan engine 200 includes fuel controlling circuitry 212 communicatively coupled to the fuel circuit 210, as discussed further in association with FIG. 4.

Figure 3:
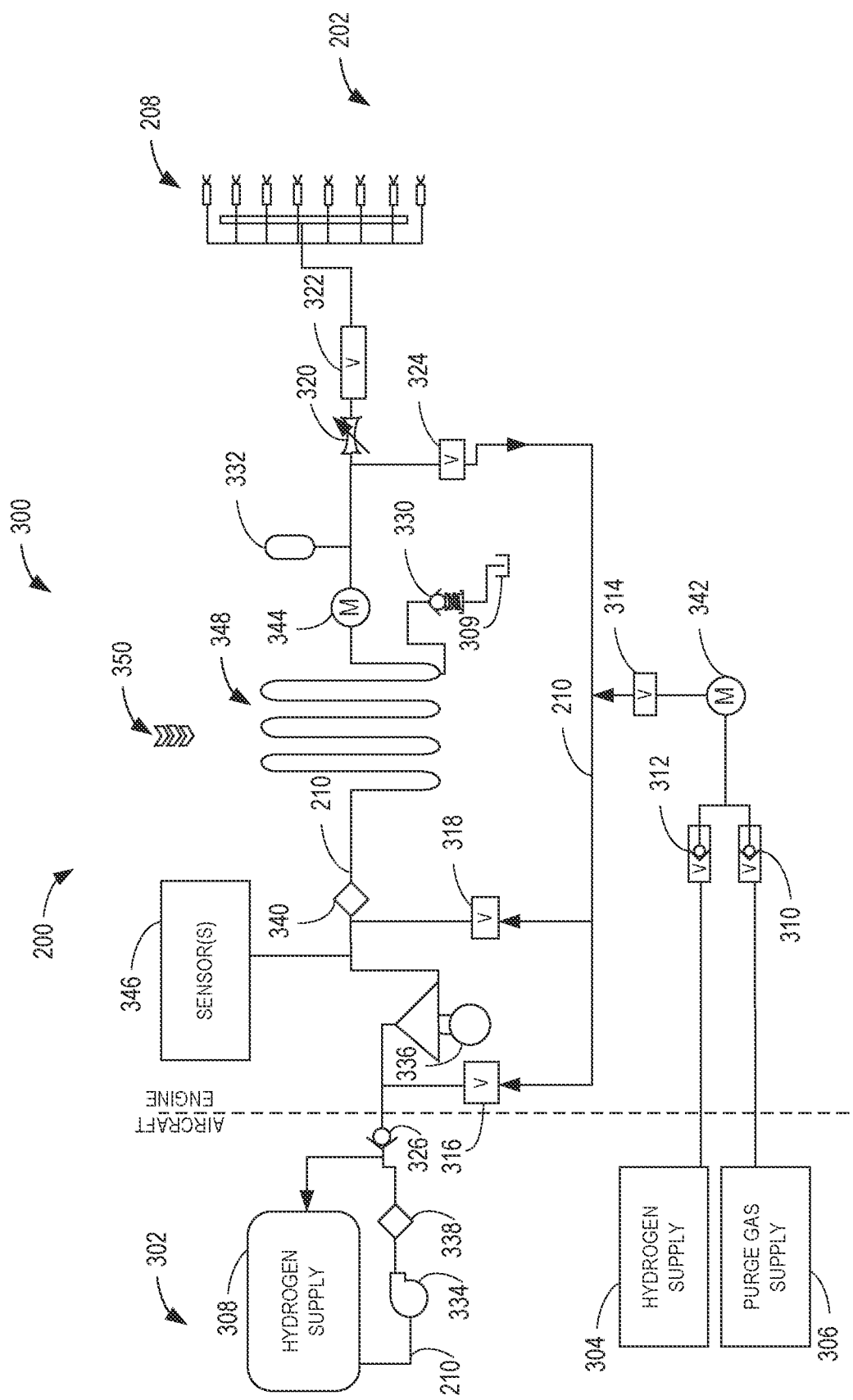
FIG. 3 is a schematic representation of a fuel circuit of the turbofan engine of FIG. 2.

FIG. 3 is a schematic representation 300 of the fuel circuit 210 of the turbofan engine 200 of FIG. 2. In FIG. 3, a portion of the fuel circuit 210 is located in an aircraft 302 (e.g., a body of an aircraft) associated with the turbofan engine 200. In FIG. 3, the fuel circuit 210 is fluidly coupled to the nozzles 208 of the combustor 202, a first hydrogen supply 304 (e.g., a gaseous hydrogen supply), a purge gas supply 306 (e.g., an inert gas supply), a second hydrogen supply 308 (e.g., a cryogenic hydrogen supply), and a vent 309.

In FIG. 3, the fuel circuit 210 includes a first valve 310, a second valve 312, a third valve 314 (e.g., a purge valve), a fourth valve 316, a fifth valve 318, a sixth valve 320 (e.g., a fuel metering valve), a seventh valve 322 (e.g., a shut-off over-speed valve), an eighth valve 324, a ninth valve 326, a tenth valve 330 (e.g., an over-pressure valve), and an accumulator 332 to locally manage a pressure and flow within the fuel circuit 210. In FIG. 3, the first valve 310, the second valve 312, the third valve 314, the fourth valve 316, the fifth valve 318, the sixth valve 320, the seventh valve 322, the eighth valve 324, and the ninth valve 326 are actively driven (e.g., commanded) valves. In FIG. 3, the tenth valve 330 is a passive valve that enables fluid to pass in response to encountering pressure greater than a pressure threshold. Moreover, the tenth valve 330 enables fluid to escape the fuel circuit 210 via the vent 309 to prevent an overpressure event from occurring in the fuel circuit 210. In FIG. 3, the accumulator 332 counteracts dynamic pressure oscillations in the fuel circuit 210 and, thus, enables the fuel circuit 210 to maintain a relatively consistent pressure.

In FIG. 3, the fuel circuit 210 includes a first pump 334 (e.g., a cryogenic pump), a second pump 336 (e.g., a liquid hydrogen pump, a centrifugal pump, a positive displacement pump), a first filter 338, and a second filter 340. In FIG. 3, the first filter 338 and the second filter 340 trap solid particles and enable liquid or gas to flow therethrough. In FIG. 3, the first pump 334 traps hydrogen gas that escapes from the second hydrogen supply 308 and condenses the hydrogen gas on a cold surface such that the hydrogen gas returns to a cryogenic form. In turn, the first pump 334 pumps the cryogenic hydrogen towards the first filter 338. When the ninth valve 326 is closed, the cryogenic hydrogen returns to the second hydrogen supply. When the ninth valve 326 is open, the cryogenic hydrogen flows towards the second pump 336. In FIG. 3, the second pump 336 pumps the liquid hydrogen towards the nozzles 208. In some examples, the second pump 336 pumps the liquid hydrogen in response to encountering a pressure greater than a pressure threshold. In such examples, the first pump 334 and the first filter 338 provide the liquid hydrogen to the second pump 336 at a pressure greater than the pressure threshold by catching non-liquid hydrogen particles.

In some examples, the first filter 338 and the second filter 340 include valves to enable offloading of solid materials caught by the filters 338, 340. For example, the first filter 338 and the second filter 340 can include manually operable valves that are opened by an operator during maintenance (e.g., between flights) to enable the solid materials to be removed from the fuel circuit 210.

In FIG. 3, the fuel circuit 210 includes a first trim vaporizer 342 (also referred to as a first trim heater or a first heat exchanger) and a second trim vaporizer 344 (also referred to as a second trim heater or a second heat exchanger). The first trim vaporizer 342 and the second trim vaporizer 344 provides thermal energy to the fuel circuit 210 and, thus, warms fluids in the fuel circuit 210. In some examples, the hydrogen boiling off of the cryogenic hydrogen in the second hydrogen supply can be routed to one or more different areas in the fuel circuit 210 and utilized as a heat exchanger. In some examples, a portion of an outer surface of the fuel circuit 210 is in contact with ambient air, which can serve as a heat exchanger. In some other examples, the fuel circuit 210 includes a different type of heat exchanger to increase the temperature of the fuel circuit 210. For example, the fuel circuit 210 can receive thermal energy from engine bleed air.

In some examples, the fuel circuit 210 includes sensors 346. For example, the fuel circuit 210 can include one or more temperature sensors, pressure sensors, flow rate sensors, gas composition sensors, position sensors, flow meters (e.g., mass flow meters) and/or motion sensors. The sensors 346 can positioned in one or more locations throughout the fuel circuit 210 to measure parameters associated with the fuel circuit 210 in a local area. In some examples, one or more of the sensors 346 are positioned external to the fuel circuit 210. For example, a temperature sensor can be positioned external to the fuel circuit 210 to measure an amount of thermal energy that the fuel circuit 210 receives from an operation of the turbofan engine 200. In some examples, the sensor(s) 346 are positioned to measure parameters in the combustor 202. In some examples, the temperature, pressure, flow rate, and/or gas composition can be determined indirectly based on the operations of the fuel circuit 210. For example, the fuel circuit 210 may be warmed to a predetermined temperature when the first trim vaporizer 342 and/or the second trim vaporizer 344 are active for a predetermined period of time. Likewise, the pressure, flow rate, and/or gas composition in the fuel circuit 210 can be determined based on operations of the valves 312, 314, 316, 318, 320, 322, 324, 326, 330, the accumulator 332, and/or the pumps 334, 336. In some examples, the sensor(s) 346 can determine a position of the passive valves (e.g., via a motion sensor(s)).

During a startup operation of the turbofan engine 200, the fuel circuit 210 is primed and purged. To prime the fuel circuit 210, the first trim vaporizer 342 and the second trim vaporizer 344 are activated to increase a temperature of the fuel circuit 210. In some examples, the fuel circuit 210 includes inert gas from the purge gas supply 306 during the startup operation as a result of a purge performed during a previous shutdown operation. As a result, the inert gas in the fuel circuit 210 is warmed up by the first trim vaporizer 342 and the second trim vaporizer 344.

When a temperature of the fuel circuit 210 is greater than a threshold temperature, an inert gas purges the fuel circuit 210. For example, the fuel circuit 210 can be purged when the temperature of the fuel circuit 210 is greater than or equal to the liquification temperature of the inert gas stored in the purge gas supply 306. In turn, to purge the fuel circuit 210 during the startup operation, the first valve 310 is opened to enable the inert gas from the purge gas supply 306 to flow into the fuel circuit 210. Accordingly, the inert gas flows through the first trim vaporizer 342, which increases a temperature of the inert gas. In some examples, the inert gas is warmed for at least a threshold period of time and/or to satisfy a temperature threshold in advance of the third valve 314, the fourth valve 316, and/or the fifth valve 318 opening. Specifically, the inert gas enters a colder portion of the fuel circuit 210 (e.g., a portion of the fuel circuit 210 in a closer proximity to the cryogenic hydrogen supply and flow) in response to the fourth valve 316 and the fifth valve 318 opening. Thus, the first trim vaporizer 342 increases the temperature of the inert gas such that the temperature does not fall below the liquification temperature associated with the inert gas in response to entering the colder portion of the fuel circuit 210. In some examples, the third valve 314 opens in advance of the fourth valve 316 and/or the fifth valve 318 opening to enable the first trim vaporizer 342 to warm a larger volume of the inert gas in advance of the inert gas entering the colder portion of the fuel circuit 210. To enable the inert gas to complete the purge by flowing through the nozzles 208 and escaping the fuel circuit 210 through the combustor 202, the sixth valve 320 and the seventh valve 322 are opened in response to the fourth valve 316 and the fifth valve 318 opening.

When the fuel circuit 210 is purged, the second valve 312 is opened to release gaseous hydrogen from the first hydrogen supply 304 into the fuel circuit 210. In some examples, when the inert gas is trapped in the fuel circuit 210 in response to a purge during a preceding shutdown of the turbofan engine 200, another purge during the startup of the turbofan engine 200 may not be performed. In such examples, the second valve 312 is opened to release the gaseous hydrogen from the first hydrogen supply 304 and cause inert gas trapped in the fuel circuit 210 to exit through the nozzles 208 during the startup operation. In such examples, the fourth valve 316 and the fifth valve 318 close and the ninth valve 326 opens in response to the inert gas exiting at least a portion of the fuel circuit 210 to induce the cryogenic hydrogen from the second hydrogen supply 308 into the fuel circuit 210. In turn, the cryogenic hydrogen converts to gas in the fuel circuit as injected into the combustor 202 for combustion, as discussed in further detail below.

In FIG. 3, the gaseous hydrogen flows through the first trim vaporizer 342, the third valve 314, the fourth valve 316, the fifth valve 318, the second filter 340, the second trim vaporizer 344, the sixth valve 320, the seventh valve 322, and the nozzles 208 to enter the combustor 202. Accordingly, the gaseous hydrogen causes the inert gas in the fuel circuit 210 to be pushed overboard in response to flowing through the fuel circuit 210. Specifically, the gaseous hydrogen from the first hydrogen supply 304 is utilized to move the inert gas out of the fuel circuit 210 instead of the cryogenic hydrogen from the second hydrogen supply because the cryogenic hydrogen would cause the inert gas to freeze and crystallize in the colder portion of the fuel circuit 210. In some examples, the gaseous hydrogen causes the inert gas in the fuel circuit 210 to exit through the combustor 202.

In some examples, the first valve 310 remains open when the second valve 312 is opened to release the gaseous hydrogen into the fuel circuit 210. As a result, the inert gas and the gaseous hydrogen blend together in the fuel circuit 210. Accordingly, mixing the inert gas and the gaseous hydrogen in the fuel circuit 210 increases (e.g., doubles) a volume of gas in the fuel circuit 210 and, thus, increases (e.g., doubles) a volumetric flow rate of the gas in the fuel circuit 210. In turn, a volumetric flow rate or exit velocity of the gas through the nozzles increases. As such, the increased velocity of the hydrogen enables the hydrogen to, in response to being injected into the combustor, have a greater separation distance from tips of the nozzles 208 under a shorter period of time. Thus, when the hydrogen ignites and combusts in the combustor 202, the increased separation between the hydrogen and the tips of the nozzles 208 reduces the combustion heat encountered by the nozzles 208. Otherwise, if the combustion of hydrogen occurred closer to the nozzles 208, the nozzles 208 would encounter damage from the high combustion temperature of the hydrogen in response to ignition.

Accordingly, to ensure the volumetric flow rate of the gases exiting the nozzles 208 will result in a separation distance between combusting hydrogen particles and the tips of the nozzles 208 greater than a threshold separation distance (e.g., a distance that prevents the nozzles 208 from encountering damaging temperatures), the volumetric flow rate of the gases in the fuel circuit 210 is compared to a volumetric flow rate threshold. Specifically, the threshold separation distance depends on a geometry of the combustor 202 positions of the nozzles 208 and/or materials associated with the nozzles 208. When the volumetric flow rate of the gases in the fuel circuit 210 satisfies (e.g., is greater than) the volumetric flow rate threshold, a flame or spark can be ignited in the combustor 202 to combust the hydrogen. Additionally or alternatively, another parameter that directly relates to the volumetric flow rate (e.g., a pressure in the fuel circuit 210) and a threshold (e.g., a pressure threshold) can be utilized in a comparison to indirectly determine whether the volumetric flow rate of the gases satisfies the volumetric flow rate threshold.

In some examples, to increase the volume of the gases in the fuel circuit 210 and, thus, increase the volumetric flow rate of the gases, the sixth valve 320 and/or the seventh valve 322 is closed, and the eighth valve 324 is opened. In turn, the gases circulate in the fuel circuit 210 to allow the volume of the gases and the pressure in the fuel circuit 210 to build-up. The tenth valve 330 can open to alleviate some pressure in the fuel circuit 210 and allow the gases to exit through the vent 309 in response to the pressure surpassing an associated pressure limit. In some examples, the hydrogen can be ignited in the combustor 202 in response to the pressure in the fuel circuit 210 reaching the pressure limit. For example, a sensor (e.g., a motion sensor) can identify when the tenth valve 330 opens, which is indicative of the pressure limit being reached and, in turn, the combustor 202 can ignite the hydrogen therein in response to the tenth valve 330 opening.

In response to combustion being initiated in the combustor 202, a composition of the inert gas in the fuel circuit 210 (e.g., a percentage composition of inert gas compared to overall gases in the fuel circuit 210) can be reduced as the turbofan engine 200 increases a power output. For example, one or more power output thresholds can be associated with one or more positions of the first valve 310 (e.g., one or more partially closed positions, a fully closed position). The one or more power output thresholds can also be associated with a composition of the inert gas being induced into the fuel circuit 210 based on the position(s) of the first valve 310. Accordingly, the first valve 310 can be fully closed to cut-off the inert gas from entering the fuel circuit 210 in response to the power output of the turbofan engine 200 satisfying a power output threshold. Further, the second valve 312 remains open to enable the hydrogen from the first hydrogen supply 304 to cause the inert gas to move through the fuel circuit 210.

When the composition of the inert gas in the fuel circuit 210 is less than a composition threshold, the ninth valve 326 is opened to induce the cryogenic hydrogen into the fuel circuit 210. For example, the composition threshold can correspond to at least a portion of the fuel circuit 210 no longer including the inert gas. In some examples, the ninth valve 326 is opened in response to a threshold period of time passing after the first valve 310 is closed. For example, the threshold period of time can be associated with an amount of time needed for the inert gas to exit the fuel circuit 210 or at least travel past the second trim vaporizer 344 such that the inert gas does not encounter the hydrogen at cryogenic temperatures. Further, the fourth valve 316 and/or the fifth valve 318 closes in response to the ninth valve 326 opening to prevent the cryogenic hydrogen from passing. Similarly, the first trim vaporizer 342 can be de-activated in response to the fourth valve 316 and/or the fifth valve 318 closing.

In FIG. 3, the second pump 336 drives the cryogenic hydrogen towards the combustor 202. Specifically, the second pump 336 enables the hydrogen to exit the nozzles 208 with a volumetric flow rate greater than the volumetric flow rate threshold. In some examples, the second pump 336 controls a flow of the cryogenic hydrogen based on an amount of hydrogen to be utilized given the settings associated with the turbofan engine (e.g., a power output).

Furthermore, the cryogenic hydrogen is warmed by the second trim vaporizer 344 and thermal energy radiating from the turbofan engine 200 as a result of the operation thereof. In turn, the second trim vaporizer 344 converts the cryogenic hydrogen from a liquid to a gaseous form and/or a supercritical form. That is, a first portion of the fuel circuit 210 (e.g., a portion of the fuel circuit 210 between the second hydrogen supply 308 and the second trim vaporizer 344) may include the hydrogen in a liquid state while a second portion of the fuel circuit 210 (e.g., a portion of the fuel circuit 210 between the second trim vaporizer 344 and the combustor 202) may include the hydrogen in a gaseous state and/or a supercritical state.

In some examples, when a portion of the turbofan engine 200 is operating at a temperature that satisfies a temperature threshold, the second trim vaporizer 344 is de-activated. For example, the temperature threshold corresponds to a temperature of the turbofan engine that radiates enough thermal energy to convert the cryogenic hydrogen from liquid to gas in the fuel circuit 210 without the second trim vaporizer 344. A portion 348 the fuel circuit 210 can be positioned to receive engine heat 350. In FIG. 3, the portion 348 of the fuel circuit 210 includes a looped geometry to enable the hydrogen to absorb the engine heat 350 from the turbofan engine for a greater period of time and over a larger portion of the fuel circuit 210. In some other examples, the portion 348 of the fuel circuit 210 includes an alternative geometry to increase flow near the engine heat 350 radiated by the turbofan engine 200. Accordingly, as the portion 348 of the fuel circuit 210 absorbs the engine heat 350, the fuel circuit 210 can prevent the portion of the turbofan engine 200 from overheating.

When the turbofan engine 200 is to shut down, the first trim vaporizer 342 is re-activated. In some examples, the second trim vaporizer 344 is re-activated with the first trim vaporizer 342 during the shutdown. Further, the second valve 312 is opened to induce gaseous hydrogen from the first hydrogen supply 304 into the fuel circuit 210. In turn, the first trim vaporizer 342 warms the gaseous hydrogen. In some examples, the third valve 314 opens in advance of the fourth valve 316 and the fifth valve 318 to enable a larger volume of the gaseous hydrogen to be warmed by the first trim vaporizer for a greater period of time before contacting the colder portion of the fuel circuit 210 utilized to transport the liquid hydrogen. When the gaseous hydrogen is warmed for a threshold period of time and/or to a threshold temperature, the ninth valve 326 closes to prevent the cryogenic hydrogen from leaving the body of the aircraft 302. In turn, the fourth valve 316 and the fifth valve 318 open to enable the gaseous hydrogen to flow into and warm up the colder portion of the fuel circuit 210. In some examples, the eighth valve 324 opens to enable warmed hydrogen to recirculate towards the colder portion of the fuel circuit 210.

When a temperature of the colder portion of the fuel circuit 210 satisfies (e.g., is greater than) a temperature threshold, the first valve 310 opens to enable the inert gas to be induced into the fuel circuit 210 from the purge gas supply 306. Further, the second valve 312 closes to stop the gaseous hydrogen from being injected into the fuel circuit 210. As a result, the inert gas causes the hydrogen to move through the fuel circuit 210 and exit through the nozzles 208. When the fuel circuit 210 no longer includes the hydrogen, the sixth valve 320, the seventh valve 322, and/or the first valve 310 close to trap the inert gas in the fuel circuit 210. As a result, the fuel circuit 210 remains safe from risks associated with the utilization of hydrogen as fuel, such as combustion flashback and/or flame holding.

Figure 4:
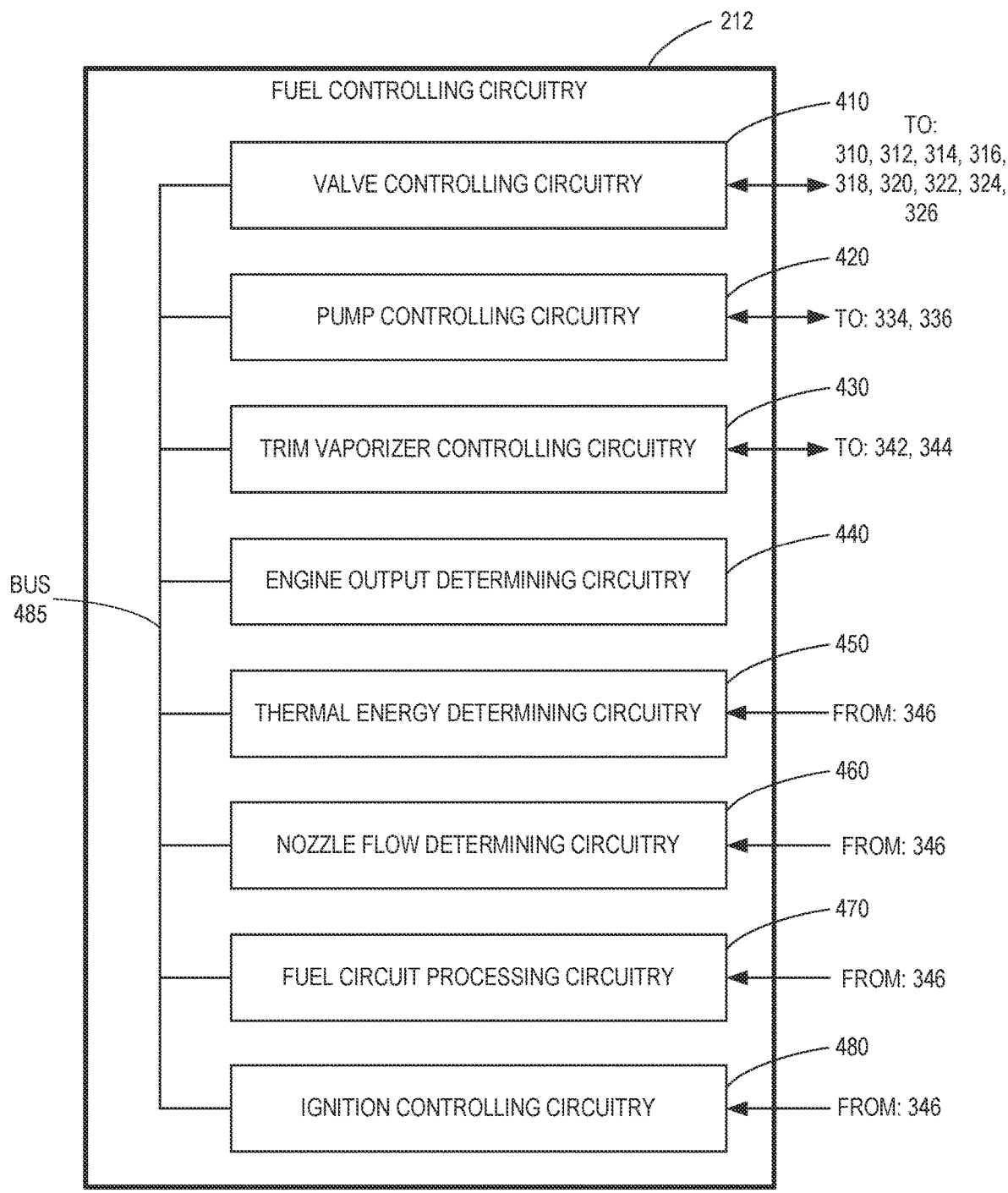
FIG. 4 is a block diagram of fuel line circuitry associated with the fuel circuit of FIG. 3.

FIG. 4 is a block diagram of the fuel controlling circuitry 212 of FIG. 2. In FIG. 4, the fuel controlling circuitry 212 controls and operates the fuel circuit 210. In FIG. 4, the fuel controlling circuitry 212 includes valve controlling circuitry 410, pump controlling circuitry 420, trim vaporizer controlling circuitry 430, engine output determining circuitry 440, thermal energy determining circuitry 450, nozzle flow determining circuitry 460, fuel circuit processing circuitry 470, and ignition controlling circuitry 480 communicatively coupled via a bus 485. The fuel controlling circuitry 212 of FIG. 2 may be instantiated by processor circuitry such as a central processing unit executing instructions. Additionally or alternatively, the fuel controlling circuitry 212 of FIG. 2 may be instantiated by an ASIC or an FPGA structured to perform operations corresponding to the instructions.

In FIG. 4, the valve controlling circuitry 410 is operatively coupled to the first valve 310, the second valve 312, the third valve 314, the fourth valve 316, the fifth valve 318, the sixth valve 320, the seventh valve 322, the eighth valve 324, and the ninth valve 326. The valve controlling circuitry 410 controls a position of the respective valves 310, 312, 314, 316, 318, 320, 322, 324, 326. For example, the valve controlling circuitry 410 can open the first valve 310 to induce inert gas from the purge gas supply 306 (FIG. 3) into the fuel circuit 210 (FIGS. 2 and 3). The valve controlling circuitry 410 can open the second valve 312 to induce hydrogen gas from the first hydrogen supply 304 into the fuel circuit 210. The valve controlling circuitry 410 can open the third valve 314 to enable the hydrogen gas and/or the inert gas to flow through the fuel circuit 210 at least up to the fourth valve 316 and/or the fifth valve 318. Further, the valve controlling circuitry 410 can open the fourth valve 316 and/or the fifth valve 318 to enable the hydrogen gas and/or the inert gas to flow through the fuel circuit 210 at least up to the sixth valve 320, the seventh valve 322, and/or the eighth valve 324. The valve controlling circuitry 410 can open the sixth valve 320 and the seventh valve 322 to enable the hydrogen gas and/or the inert gas to be injected into the combustor 202 (FIG. 2) via the nozzles 208 (FIG. 2). Additionally or alternatively, the valve controlling circuitry 410 can open the eighth valve 324 to enable the hydrogen gas and/or the inert gas to recirculate the fuel circuit 210. The valve controlling circuitry 410 can open the ninth valve 326 to cause cryogenic hydrogen from the second hydrogen supply 308 to flow towards the combustor 202.

In some examples, to purge the fuel circuit 210 before the turbofan engine 200 accepts a load, the valve controlling circuitry 410 opens at least the first valve 310 to induce the inert gas through the fuel circuit 210. In some other examples, the fuel circuit 210 is already filled with the inert gas from a purge during a previous shutdown operation. In such examples, the valve controlling circuitry 410 opens at least the second valve 312 while the first valve 310 may remain closed to enable the hydrogen from the first hydrogen supply 304 to flush the inert gas out of the fuel circuit 210. In such examples, the valve controlling circuitry 410 opens the ninth valve 326 and closes the fourth valve 316 and the fifth valve 318 to direct the cryogenic hydrogen towards the combustor 202 in response to the inert gas being emptied from at least a portion of the fuel circuit 210 such that the cryogenic hydrogen avoids encountering the inert gas. In some examples, the valve controlling circuitry 410 modulates a position of the sixth valve 320 based on a determined or desired output for the turbofan engine 200.

In some examples, to enable the turbofan engine 200 to shut down, the valve controlling circuitry 410 closes the ninth valve 326 to stop the cryogenic hydrogen from flowing towards the combustor 202. Further, the valve controlling circuitry 410 can open the second valve 312, the third valve 314, the fourth valve 316, and the fifth valve 318 to enable the gaseous hydrogen to flow and warm up the fuel circuit 210. When the fuel circuit is warmed and cleared of cryogenic hydrogen, the valve controlling circuitry opens the first valve 310 and closes the second valve 312 to enable the hydrogen to be cleared out of the fuel circuit 210. When the fuel circuit 210 no longer includes hydrogen from the ninth valve 326 to the combustor 202, the valve controlling circuitry 410 closes the first valve 310, the sixth valve 320, and/or the seventh valve 322 to trap the inert gas in the fuel circuit 210.

In FIG. 4, the pump controlling circuitry 420 controls the second pump 336. For example, the pump controlling circuitry 420 can control a velocity at which the cryogenic hydrogen exits the second pump 336. Accordingly, when the turbofan engine 200 is fueled by the hydrogen from the second hydrogen supply 308, the pump controlling circuitry 420 can ensure that the velocity of the hydrogen exiting the nozzles satisfies a velocity threshold and, in turn, results in a separation distance between tips of the nozzles 208 and the hydrogen particles upon combustion such that heat from the combustion does not damage the nozzles 208. In some examples, the pump controlling circuitry 420 controls the first pump 334.

In FIG. 4, the trim vaporizer controlling circuitry 430 controls the first trim vaporizer 342 and the second trim vaporizer 344. For example, the trim vaporizer controlling circuitry 430 can activate the first trim vaporizer 342 and the second trim vaporizer 344 to provide heat to the fuel circuit 210. Accordingly, the trim vaporizer controlling circuitry 430 can activate the first trim vaporizer 342 and the second trim vaporizer 344 to affect the inert gas and/or the hydrogen gas when priming and/or purging the fuel circuit 210. Specifically, the first trim vaporizer 342 and the second trim vaporizer 344 affect the inert gas and/or the hydrogen gas by heating up (e.g., increasing a temperature of) the inert gas and/or the hydrogen gas. Further, the first trim vaporizer 342 and the second trim vaporizer 344 can affect the inert gas and/or the hydrogen gas by maintaining a temperature of the inert gas and/or the hydrogen gas in response to the inert gas and/or the hydrogen gas being warmed up. In some examples, the trim vaporizer controlling circuitry 430 de-activates the first trim vaporizer 342 when cryogenic hydrogen is injected towards the combustor 202. In some examples, the trim vaporizer controlling circuitry 430 de-activates the second trim vaporizer 344 when the turbofan engine 200 radiates enough heat to convert the cryogenic hydrogen to a gaseous state as the hydrogen flows towards the combustor 202.

In FIG. 4, the engine output determining circuitry 440 determines a power output of the turbofan engine 200. In some examples, the engine output determining circuitry 440 compares the output of the turbofan engine 200 to power output thresholds. Specifically, the respective power output thresholds correspond to compositions of the inert gas in the fuel circuit 210. As such, when the power output of the turbofan engine 200 satisfies (e.g., is greater than) a first power output threshold associated with a partial (e.g., 25%, 50%, 75%, etc.) reduction in the composition of the inert gas in the fuel circuit 210, the engine output determining circuitry 440 can transmit a signal indicative of the reduction to the valve controlling circuitry 410, which can partially close the first valve 310 to reduce the amount of inert gas being released into the fuel circuit. Further, when the power output of the turbofan engine 200 satisfies a second power output threshold associated with a full removal of the inert gas, the engine output determining circuitry 440 can transmit a signal indicative of the removal to the valve controlling circuitry 410, which can fully close the first valve 310.

In FIG. 4, the thermal energy determining circuitry 450 can determine an amount of thermal energy that the fuel circuit 210 receives from the turbofan engine 200. For example, the thermal energy determining circuitry 450 can determine the thermal energy radiating from the turbofan engine via the sensors 346. In some examples, the thermal energy determining circuitry 450 estimates the amount of thermal energy that the fuel circuit 210 is receiving from the turbofan engine based on the power output of the turbofan engine, a run-time of the turbofan engine, a surface area of the fuel circuit 210 encountering the thermal energy radiated by the turbofan engine 200, and/or a separation distance between a source of the thermal energy and the surface area of the fuel circuit 210. Accordingly, the thermal energy determining circuitry 450 can transmit a signal to the trim vaporizer controlling circuitry 430 in response to the fuel circuit 210 receiving an amount of thermal energy that satisfies (e.g., is greater than) a thermal energy threshold. Specifically, the thermal energy threshold corresponds to an amount of thermal energy from the turbofan engine that causes the cryogenic hydrogen to convert to a gaseous form as the hydrogen flows through the fuel circuit 210. In turn, the trim vaporizer controlling circuitry 430 can de-activate the second trim vaporizer 344.

In FIG. 4, the nozzle flow determining circuitry 460 determines a flow rate (e.g., a volumetric flow rate, a mass flow rate, etc.) of the hydrogen and/or inert gas exiting the nozzles 208. In some examples, the nozzle flow determining circuitry 460 determines the flow rate based on the output of the second pump 336. In some examples, the nozzle flow determining circuitry 460 determines the flow rate via the sensors 346. In some examples, the nozzle flow determining circuitry 460 compares the flow rate of the hydrogen exiting the nozzles 208 to a flow rate threshold. Specifically, the flow rate threshold corresponds to a flow of the hydrogen that causes the hydrogen to exit and separate from the nozzles 208 by at least a threshold distance within a threshold period of time such that, when the hydrogen combusts after the threshold period of time expiring, the nozzles 208 avoid damage from the heat of the combustion. Accordingly, the nozzle flow determining circuitry 460 can transmit a signal indicative of the hydrogen being ready for ignition to the ignition controlling circuitry 480 when the flow rate of the hydrogen satisfies the flow rate threshold. In FIG. 4, the ignition controlling circuitry 480 causes a flame to ignite within the combustor 202 in response to the flow rate of hydrogen satisfying the threshold.

In FIG. 4, the fuel circuit processing circuitry 470 determines parameters associated with the fuel circuit 210. For example, the fuel circuit processing circuitry 470 can determine a temperature of the fuel circuit 210 via the sensors 346 and/or based on operations of the first and second trim vaporizers 342, 344. Additionally or alternatively, the fuel circuit processing circuitry 470 can determine the temperature of the fuel circuit 210 determined amount of thermal energy that the fuel circuit 210 receives from the turbofan engine 200. Further, the fuel circuit processing circuitry 470 can determine a composition of hydrogen and inert gas in the fuel circuit via the sensors 346 and/or based on operations of the valves 310, 312, 314, 316, 318, 320, 322, 324, 326.

In some examples, the example turbofan engine 200 of FIG. 2 includes means for priming to provide thermal energy to a fuel circuit. For example, the means for priming may be implemented by the first trim vaporizer 342, the second trim vaporizer 344, the engine heat 350, a surface heater, and/or gaseous hydrogen.

In some examples, the example turbofan engine 200 of FIG. 2 includes means for purging the fuel circuit. For example, the means for purging may be implemented by nitrogen, helium, and/or any other inert gas.

In some examples, the example turbofan engine 200 of FIG. 2 includes means for combusting. For example, the means for combusting may be implemented by hydrogen and/or any other combustible gas.

While an example manner of implementing the fuel controlling circuitry 212 of FIG. 2 is illustrated in FIG. 4, one or more of the elements, processes, and/or devices illustrated in FIG. 4 may be combined, divided, re-arranged, omitted, eliminated, and/or implemented in any other way. Further, the example valve controlling circuitry 410, the example pump controlling circuitry 420, the example trim vaporizer controlling circuitry 430, the example engine output determining circuitry 440, the example engine thermal energy determining circuitry 450, the example nozzle flow determining circuitry 460, the example fuel circuit processing circuitry 470, the example ignition controlling circuitry 480, and/or, more generally, the example fuel controlling circuitry of FIGS. 2 and 4, may be implemented by hardware, software, firmware, and/or any combination of hardware, software, and/or firmware. Thus, for example, any of the example valve controlling circuitry 410, the example pump controlling circuitry 420, the example trim vaporizer controlling circuitry 430, the example engine output determining circuitry 440, the example engine thermal energy determining circuitry 450, the example nozzle flow determining circuitry 460, the example fuel circuit processing circuitry 470, the example ignition controlling circuitry 480, and/or, more generally, the example fuel controlling circuitry, could be implemented by processor circuitry, analog circuit(s), digital circuit(s), logic circuit(s), programmable processor(s), programmable microcontroller(s), graphics processing unit(s) (GPU(s)), digital signal processor(s)

(DSP(s)), application specific integrated circuit(s) (ASIC(s)), programmable logic device(s) (PLD(s)), and/or field programmable logic device(s) (FPLD(s)) such as Field Programmable Gate Arrays (FPGAs). When reading any of the apparatus or system claims of this patent to cover a purely software and/or firmware implementation, at least one of the example valve controlling circuitry 410, the example pump controlling circuitry 420, the example trim vaporizer controlling circuitry 430, the example engine output determining circuitry 440, the example engine thermal energy determining circuitry 450, the example nozzle flow determining circuitry 460, the example fuel circuit processing circuitry 470, and/or the example ignition controlling circuitry 480 is/are hereby expressly defined to include a non-transitory computer readable storage device or storage disk such as a memory, a digital versatile disk (DVD), a compact disk (CD), a Blu-ray disk, etc., including the software and/or firmware. Further still, the example fuel controlling circuitry 212 of FIGS. 2 and 4 may include one or more elements, processes, and/or devices in addition to, or instead of, those illustrated in FIG. 4, and/or may include more than one of any or all of the illustrated elements, processes, and devices.

Figure 5:
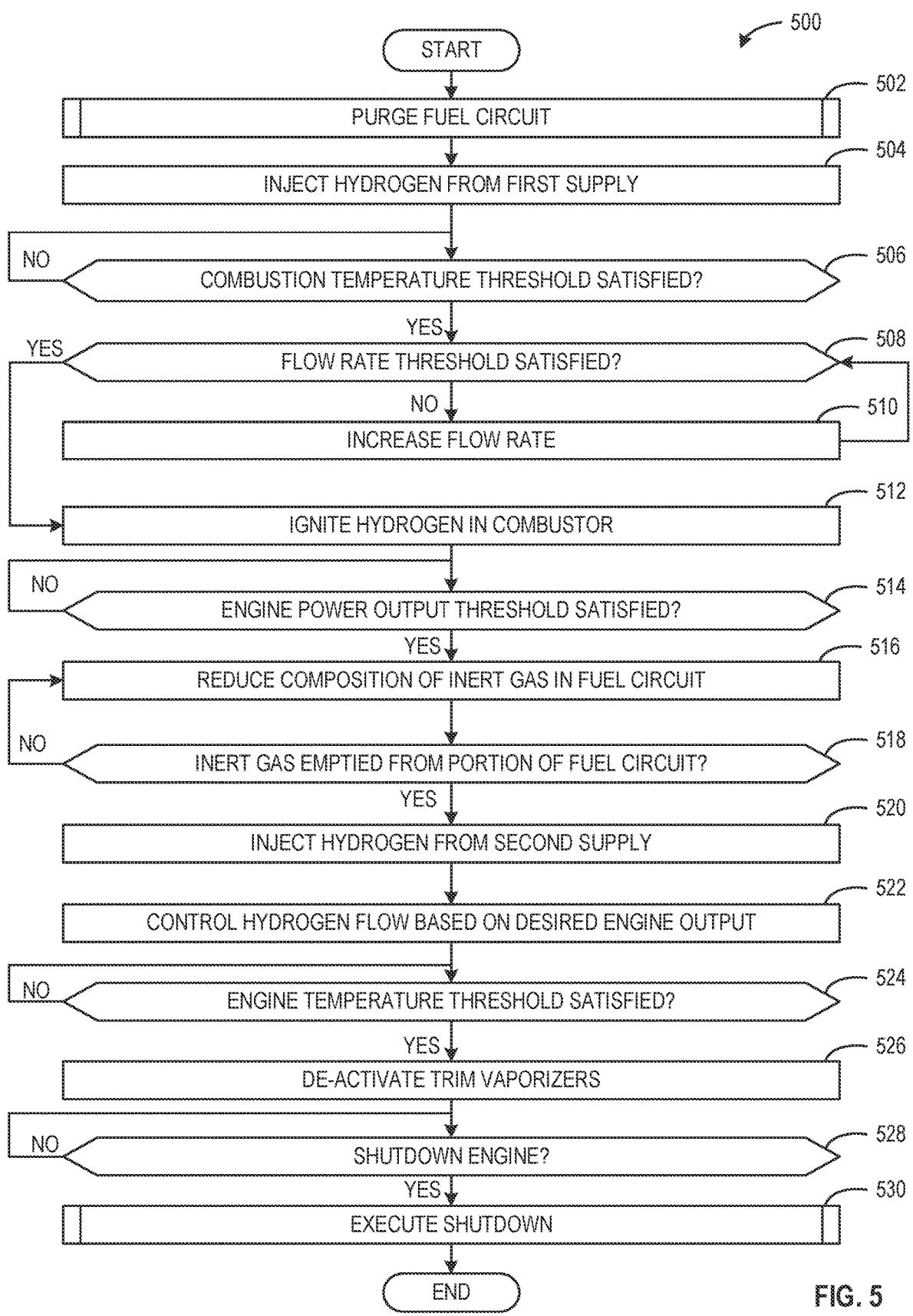
FIG. 5 is a first flowchart representative of example machine readable instructions that may be executed by example processor circuitry to implement the fuel line circuitry of FIG. 4.
Figure 6:
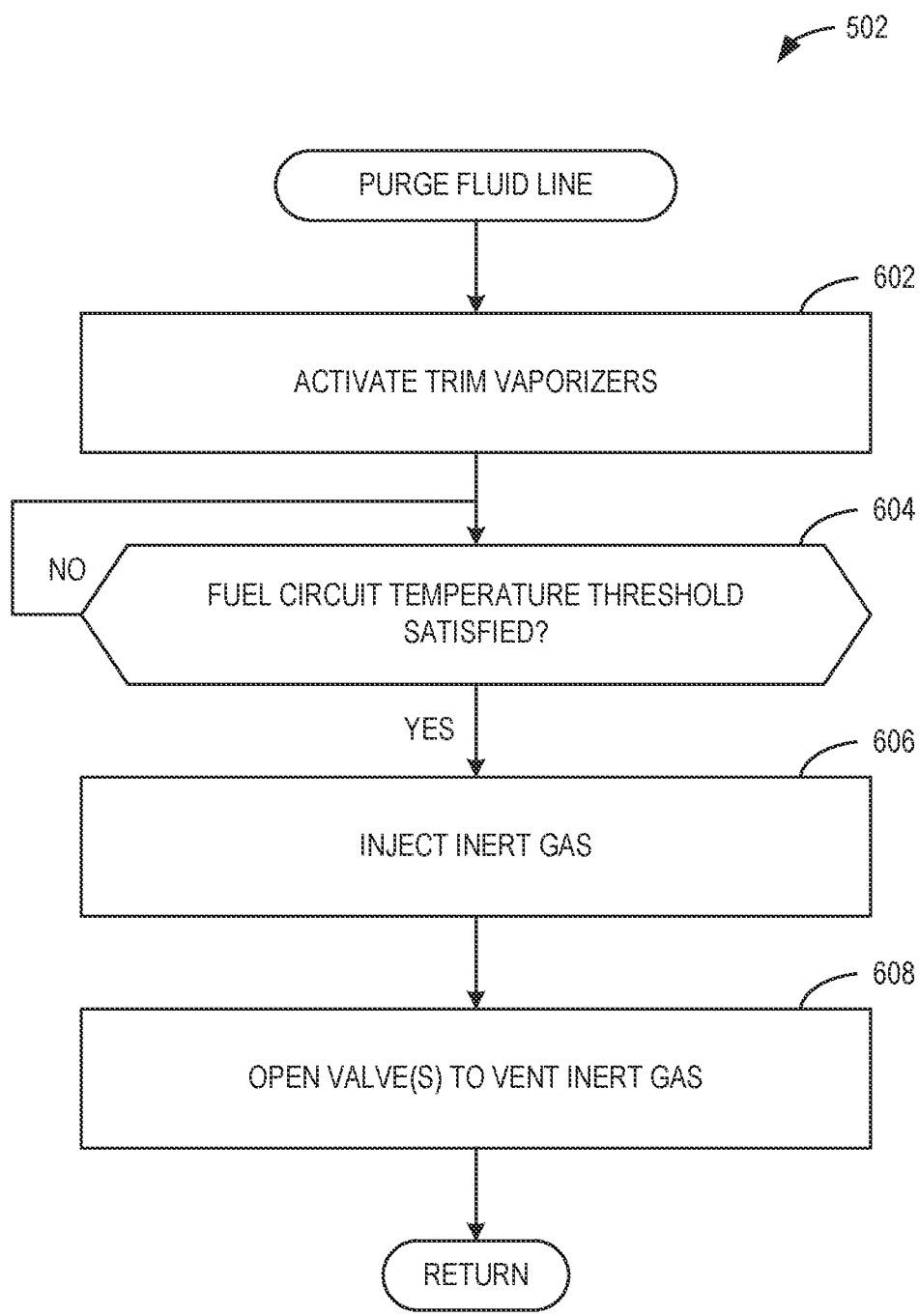
FIG. 6 is a second flowchart representative of example machine readable instructions that may be executed by example processor circuitry to implement the fuel line circuitry of FIG. 4.
Figure 7:
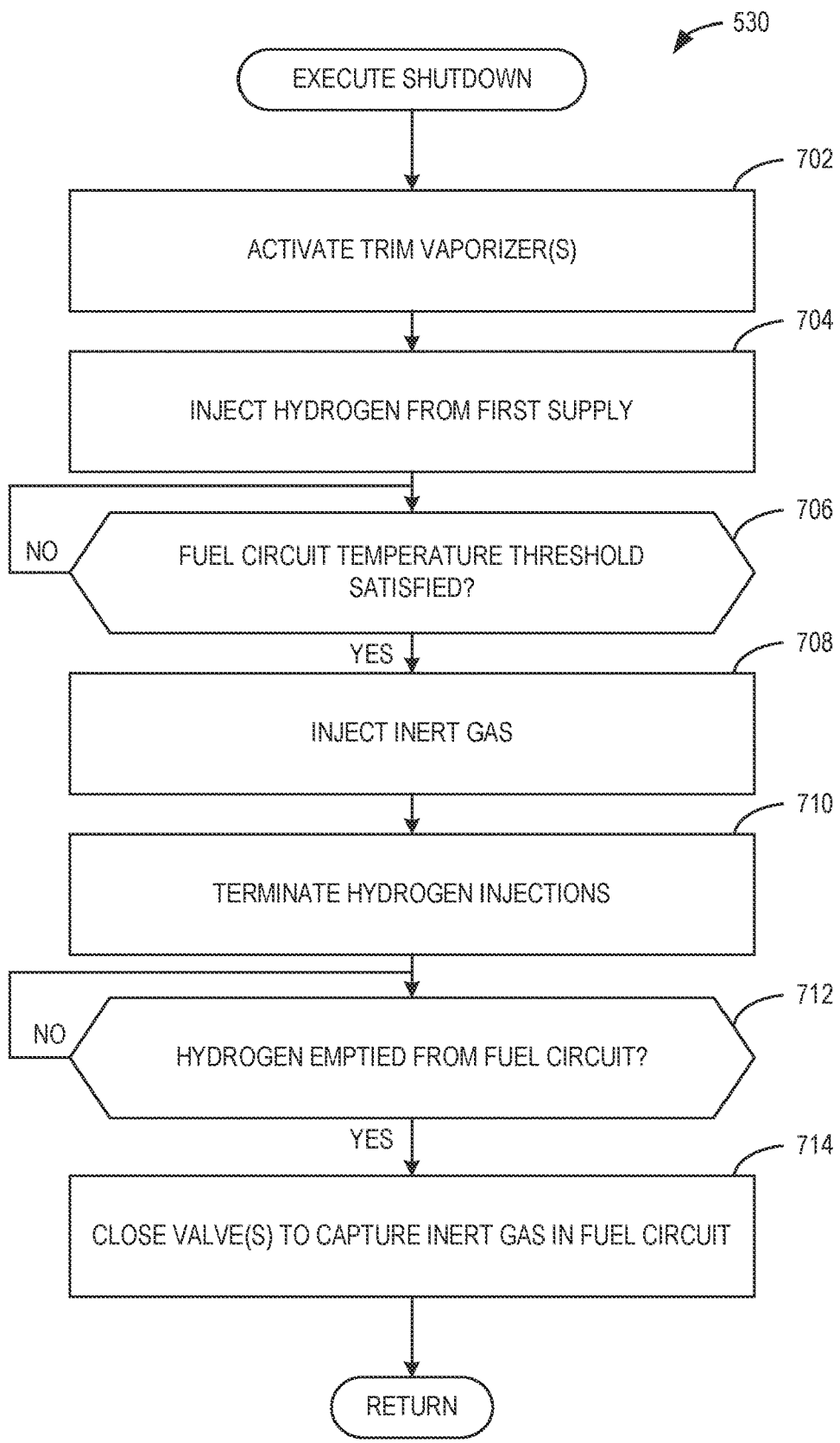
FIG. 7 is a third flowchart representative of example machine readable instructions that may be executed by example processor circuitry to implement the fuel line circuitry of FIG. 4.

A flowchart representative of example hardware logic circuitry, machine readable instructions, hardware implemented state machines, and/or any combination thereof for implementing the fuel controlling circuitry of FIGS. 2 and 4 is shown in FIGS. 5, 6, and 7. The machine readable instructions may be one or more executable programs or portion(s) of an executable program for execution by processor circuitry, such as the processor circuitry 812 shown in the example processor platform 800 discussed below in connection with FIG. 8. The program may be embodied in software stored on one or more non-transitory computer readable storage media such as a CD, a floppy disk, a hard disk drive (HDD), a DVD, a Blu-ray disk, a volatile memory (e.g., Random Access Memory (RAM) of any type, etc.), or a non-volatile memory (e.g., FLASH memory, an HDD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN) gateway that may facilitate communication between a server and an endpoint client hardware device). Similarly, the non-transitory computer readable storage media may include one or more mediums located in one or more hardware devices. Further, although the example program is described with reference to the flowcharts illustrated in FIGS. 5, 6, and 7, many other methods of implementing the example fuel controlling circuitry 212 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C #, Perl, Python, JavaScript, HyperText Markup Language (HTML), Structured Query Language (SQL), Swift, etc.

As mentioned above, the example operations of FIGS. 5, 6, and 7 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium is expressly defined to include any type of computer readable storage device and/or storage disk and to exclude propagating signals and to exclude transmission media.

FIG. 5 is a flowchart representative of example machine readable instructions and/or example operations 500 that may be executed and/or instantiated by processor circuitry to operate the turbofan engine utilizing hydrogen as fuel. The machine readable instructions and/or operations 500 of FIG. 5 begin at block 502, at which the fuel controlling circuitry 212 (FIGS. 2 and 4) purges the fuel circuit 210 (FIGS. 2 and 3). For example, the fuel controlling circuitry 212 can activate the first trim vaporizer 342 and the second trim vaporizer 344 to warm the fuel circuit 210. Further, the fuel controlling circuitry 212 can inject an inert gas through the fuel circuit 210. Example instructions that may be executed to purge the fuel circuit 210 are discussed below in association with FIG. 6. In some examples, the fuel controlling circuitry 212 may skip at least a portion of the initial purge in response to the fuel circuit 210 being filled with inert gas from a previous shutdown operation.

At block 504, the fuel controlling circuitry 212 injects hydrogen into the fuel circuit 210. For example, the valve controlling circuitry 410 (FIG. 4) can open the second valve 312 (FIG. 3) to enable gaseous hydrogen from the first hydrogen supply 304 (FIG. 3) to enter the fuel circuit 210. In some examples, the gaseous hydrogen blends with the inert gas.

At block 506, the fuel controlling circuitry 212 determines whether a temperature of the fuel circuit 210 satisfies a combustion temperature threshold. Specifically, the temperature threshold corresponds to a temperature that enables combustion of hydrogen in the combustor 202 upon ignition. In some examples, the combustion temperature threshold is based on a rate at which the hydrogen is to combust in the combustor 202 for a given power output of the turbofan engine 200. The trim vaporizer controlling circuitry 430 (FIG. 4) can transmit a signal to the fuel circuit processing circuitry 470 (FIG. 4) indicative of an operation (e.g., an activation) of the first trim vaporizer 342 and/or the second trim vaporizer 344. Further, the fuel circuit processing circuitry 470 can determine the temperature of the fuel circuit 210 based on the operation of the first trim vaporizer 342 and/or the second trim vaporizer 344. In some examples, the fuel circuit processing circuitry 470 determines the temperature of the fuel circuit 210 based on a signal from the sensor(s) 346. In turn, the fuel circuit processing circuitry 470 compares the temperature of the fuel circuit 210 to the temperature threshold. When the temperature of the fuel circuit 210 satisfies (e.g., is greater than) the temperature threshold, the operations 500 proceed to block 508. When the temperature of the fuel circuit 210 does not yet satisfy the temperature threshold, the operations return to block 506.

At block 508, the fuel controlling circuitry 212 determines whether a volumetric flow rate or a mass flow rate exiting the nozzles 208 satisfies a flow rate threshold. Specifically, the flow rate threshold is based on a flow rate of hydrogen exiting the nozzles 208 that results in at least a threshold separation distance between the nozzle and the hydrogen when the hydrogen ignites in the combustor. The nozzle flow determining circuitry 460 can determine the volumetric flow rate and/or the mass flow rate in the fuel circuit 210 based on a signal from the sensor(s) 346. Additionally or alternatively, the valve controlling circuitry 410 can indicate respective positions of the valves 310, 312, 314, 316, 318, 320, 322, 324, 326 to the nozzle flow determining circuitry 460 and, in turn, the nozzle flow determining circuitry 460 can determine the flow rate exiting the nozzles 208. Further, the nozzle flow determining circuitry 460 can compare the flow rate in the fuel circuit 210 to the flow rate threshold. When the flow rate in the fuel circuit 210 satisfies (e.g., is greater than) the flow rate threshold, the operations 500 skip to block 512. When the flow rate in the fuel circuit 210 does not satisfy the flow rate threshold, the operations proceed to block 510.

At block 510, the fuel controlling circuitry 212 increases the flow rate in the fuel circuit 210. For example, the nozzle flow determining circuitry 460 can transmit a signal indicative of a request for an increased flow rate to the valve controlling circuitry 410. In turn, the valve controlling circuitry 410 can adjust a position of one or more of the valves 310, 312, 314, 316, 318, 320, 322, 324, 326 to increase the flow rate through the nozzles 208.

At block 512, the fuel controlling circuitry 212 ignites the hydrogen in the combustor 202. For example, the ignition controlling circuitry 480 (FIG. 4) can cause the combustor to create a spark and/or ignite a flame to combust the hydrogen that enters the combustor 202.

At block 514, the fuel controlling circuitry 212 determines whether a power output of the turbofan engine 200 satisfies a power output threshold. For example, the engine output determining circuitry 440 (FIG. 4) can determine the power output of the turbofan engine 200. Further, the engine output determining circuitry 440 can compare the output of the turbofan engine 200 to the power output threshold associated with the inert gas being removable from the fuel circuit 210. In some examples, the turbofan engine 200 operates at the power output threshold in response to accelerating to a synchronized idle speed. In some examples, the power output threshold corresponds to 5-15% of a rated power of the turbofan engine 200. When the power output of the turbofan engine 200 satisfies the power output threshold, the operations 500 proceed to block 516. When the power output of the turbofan engine 200 does not satisfy the power output threshold, the operations 500 return to block 514.

At block 516, the fuel controlling circuitry 212 reduces a composition of the inert gas in the fuel circuit 210. For example, the engine output determining circuitry 440 can transmit a signal to the valve controlling circuitry 410 indicative of the power output threshold being satisfied. In turn, the valve controlling circuitry 410 can cause the first valve 310 to close to prevent inert gas from being injected into the fuel circuit 210.

At block 518, the fuel controlling circuitry 212 determines whether the inert gas is emptied from at least a portion of the fuel circuit 210. For example, the fuel circuit processing circuitry 470 can determine whether the gaseous hydrogen has pushed the inert gas out of a portion of the fuel circuit 210 that encounters cryogenic hydrogen. In some examples, the fuel circuit processing circuitry 470 determines the composition in the portion of the fuel circuit 210 based on a signal from the sensor(s) 346. In some examples, the fuel circuit processing circuitry 470 determines that the portion of the fuel circuit 210 no longer includes the inert gas in response to the first valve being closed for a predetermined period of time. Specifically, the predetermined period of time is based on a distance between the first valve 310 and the portion of the fuel circuit 210 that encounters the cryogenic hydrogen. When the inert gas is emptied from the portion of the fuel circuit 210, the operations proceed to block 520. When the inert gas is not yet emptied from the portion of the fuel circuit 210, the operations return to block 516.

At block 520, the fuel controlling circuitry 212 injects the cryogenic hydrogen from the second hydrogen supply 308 into the fuel circuit 210. For example, the valve controlling circuitry 410 can cause the ninth valve 326 to open and allow the cryogenic hydrogen to flow from the body of the aircraft 302 towards the turbofan engine 200. Further, the valve controlling circuitry 410 closes the fourth valve 316 and the fifth valve 318 to maintain the cryogenic hydrogen on a path towards the combustor 202. In some examples, the trim vaporizer controlling circuitry 430 de-activates the first trim vaporizer 342 in response to the fourth valve 316 and the fifth valve 318 closing.

At block 522, the fuel controlling circuitry 212 controls a flow of the hydrogen based on a desired output of the turbofan engine 200. For example, the pump controlling circuitry 420 (FIG. 4) can control an output of the second pump 336 based on the desired output of the turbofan engine 200. Further, the valve controlling circuitry 410 can control a position of the sixth valve 320 based on the desired output of the turbofan engine 200.

At block 524, the fuel controlling circuitry 212 determines whether a temperature of a portion of the turbofan engine 200 satisfies a temperature threshold. For example, the thermal energy determining circuitry 450 (FIG. 4) can compare the temperature of the turbofan engine 200 to the temperature threshold. Specifically, the temperature threshold is based on a temperature of the turbofan engine 200 that provides enough thermal energy to the fuel circuit 210 to enable the cryogenic hydrogen to convert from a liquid state to a gaseous state as the hydrogen flows towards the combustor 202. For example, the thermal energy determining circuitry 450 can determine the temperature of the portion of the turbofan engine 200 based on a signal from the sensors 346 and/or based on the power output of the turbofan engine 200. For instance, certain power outputs of the turbofan engine 200 may correspond to certain operating temperatures of the turbofan engine 200. Accordingly, the thermal energy determining circuitry 450 may compare the power output of the turbofan engine to a power output threshold to determine whether the turbofan engine satisfies the temperature threshold. In some examples, the temperature threshold is based on a surface area of the fuel circuit 210 that receives the thermal energy radiated by the turbofan engine 200.

At block 526, the fuel controlling circuitry 212 de-activates the second trim vaporizer 344. For example, the trim vaporizer controlling circuitry 430 can deactivate the second trim vaporizer 344 in response to the fuel circuit 210 turbofan engine 200 radiating enough thermal energy to cause the cryogenic hydrogen to convert to a gaseous state in the fuel circuit.

At block 528, the fuel controlling circuitry 212 determines whether to shut down the turbofan engine 200. For example, the engine output determining circuitry 440 can determine whether to shut down the turbofan engine 200 based on the desired output of the turbofan engine 200. When the turbofan engine 200 is shut down, the operations 500 proceed to block 530.

At block 530, the fuel controlling circuitry 212 executes a shutdown operation. For example, the fuel controlling circuitry 212 can prime and purge the fuel circuit 210 to safely shut down the fuel circuit 210. Example instructions that may be executed to prime and purge the fuel circuit during a shutdown operation are discussed below in association with FIG. 7.

FIG. 6 is a flowchart representative of example machine readable instructions and/or example operations that may be executed and/or instantiated by processor circuitry to implement block 502 of FIG. 5 to purge the fuel circuit 210. The machine readable instructions and/or operations of FIG. 6 begin at block 602, at which the fuel controlling circuitry 212 activates the first trim vaporizer 342 and the second trim vaporizer 344. For example, the trim vaporizer controlling circuitry 430 can activate the first trim vaporizer 342 and the second trim vaporizer 344.

At block 604, the fuel controlling circuitry 212 determines whether a temperature of the fuel circuit 210 satisfies a temperature threshold. Specifically, the temperature threshold corresponds to a liquification temperature of the inert gas stored in the purge gas supply 306. As such, to satisfy the temperature threshold, the temperature of the fuel circuit must be within a temperature range that maintains the inert gas in a gaseous state. For example, the fuel circuit processing circuitry 470 can determine the temperature of the fuel circuit based on a signal from the sensors 346. In some examples the fuel circuit processing circuitry 470 determines the temperature of the fuel circuit 210 based on a period of time that the first trim vaporizer 342 and the second trim vaporizer have been active. In turn, the fuel circuit processing circuitry 470 compares the temperature of the fuel circuit 210 to the temperature threshold. When the temperature of the fuel circuit 210 satisfies the temperature threshold, the operations proceed to block 606. Otherwise, the operations return to block 604 as the trim vaporizers 342, 344 continue to warm up the fuel circuit 210.

At block 606, the fuel controlling circuitry 212 injects the inert gas into the fuel circuit 210. For example, the valve controlling circuitry 410 can open the first valve 310 to release the inert gas from the purge gas supply 306. Further, the valve controlling circuitry 410 can open, the third valve 314, and the fourth valve 316 to enable the inert gas to fill the fuel circuit 210.

At block 608, the fuel controlling circuitry 212 opens the sixth valve 320 and the seventh valve 322 to vent the inert gas. For example, the valve controlling circuitry 410 can open the sixth valve 320 and the seventh valve 322 to enable the inert gas to exit the fuel circuit 210 through the combustor 202.

FIG. 7 is a flowchart representative of example machine readable instructions and/or example operations that may be executed and/or instantiated by processor circuitry to implement block 530 of FIG. 5 to shut down the fuel circuit 210. The machine readable instructions and/or operations of FIG. 7 begin at block 702, at which the fuel controlling circuitry 212 activates the first trim vaporizer 342 and, in some instances, the second trim vaporizer 344. For example, the trim vaporizer controlling circuitry 430 can activate the first trim vaporizer 342 and/or the second trim vaporizer 344. In some examples, only the first trim vaporizer 342 is activated as the turbofan engine 200 radiates enough thermal energy to warm the fuel circuit 210 near the second trim vaporizer 344.

At block 704, the fuel controlling circuitry 212 injects hydrogen from the first hydrogen supply 304 into the fuel circuit 210. For example, the valve controlling circuitry 410 can open the second valve 312, the third valve 314, the fourth valve 316, and the fifth valve 318 to enable the hydrogen to flow through the fuel circuit 210. Accordingly, the hydrogen is warmed by the first trim vaporizer 342, the second trim vaporizer 344, and/or heat from the turbofan engine 200 as the hydrogen flow through the fuel circuit 210. In some examples, the valve controlling circuitry 410 opens the eighth valve 324 to enable the warmed hydrogen to recirculate in the fuel circuit 210 and warm up the fuel circuit at a faster rate.

At block 706, the fuel controlling circuitry 212 determines whether a temperature of the fuel circuit 210 satisfies a temperature threshold. Specifically, the temperature threshold corresponds to the liquification temperature of the inert gas stored in the purge gas supply 306, similar to the temperature threshold at block 604. For example, the fuel circuit processing circuitry 470 can compare the temperature of the fuel circuit 210 to a predetermined temperature of the inert gas associated with a transition from a liquid state to gaseous state. Accordingly, when the temperature of the fuel circuit 210 is high enough to maintain the inert gas in the gaseous state, the operations proceed to block 708. Otherwise, the operations return to block 706 as the trim vaporizers 342, 344 continue to warm up the fuel circuit 210.

At block 708, the fuel controlling circuitry 212 injects the inert gas into the fuel circuit 210. For example, the valve controlling circuitry 410 can open the first valve 310 to release the inert gas from the purge gas supply 306 into the fuel circuit 210.

At block 710, the fuel controlling circuitry 212 terminates hydrogen injections. For example, the valve controlling circuitry 410 can close the second valve 312 to stop the hydrogen from entering the fuel circuit 210 from the first hydrogen supply 304. Accordingly, the inert gas flowing from the purge gas supply 306 causes the hydrogen to move through the fuel circuit 210 and exit through the combustor 202.

At block 712, the fuel controlling circuitry 212 determines whether hydrogen is emptied from the fuel circuit 210. For example, the fuel circuit processing circuitry 470 can determine whether the hydrogen is emptied from the fuel circuit based on a signal from the sensors 346 indicative of a composition of the fuel circuit. Additionally or alternatively, the fuel circuit processing circuitry 470 can determine the hydrogen is emptied from the fuel circuit 210 in response to the second valve 312 being closed for a threshold period of time. Specifically, the threshold period of time is determined based on how an amount of time it takes for the inert gas to move the remaining hydrogen in the fuel circuit 210 out through the combustor 202. When the hydrogen is emptied from the fuel circuit 210, the operations proceed to block 714.

At block 714, the fuel controlling circuitry 212 closes the sixth valve 320 and/or the seventh valve 322 to capture the inert gas in the fuel circuit 210. For example, the valve controlling circuitry 410 can close the sixth valve 320 and/or the seventh valve 322 in response to the fuel circuit no longer including hydrogen. In some examples, the valve controlling circuitry closes the first valve 310 to prevent an over-pressure even that may otherwise result from more inert gas entering the fuel circuit 210.

Figure 8:
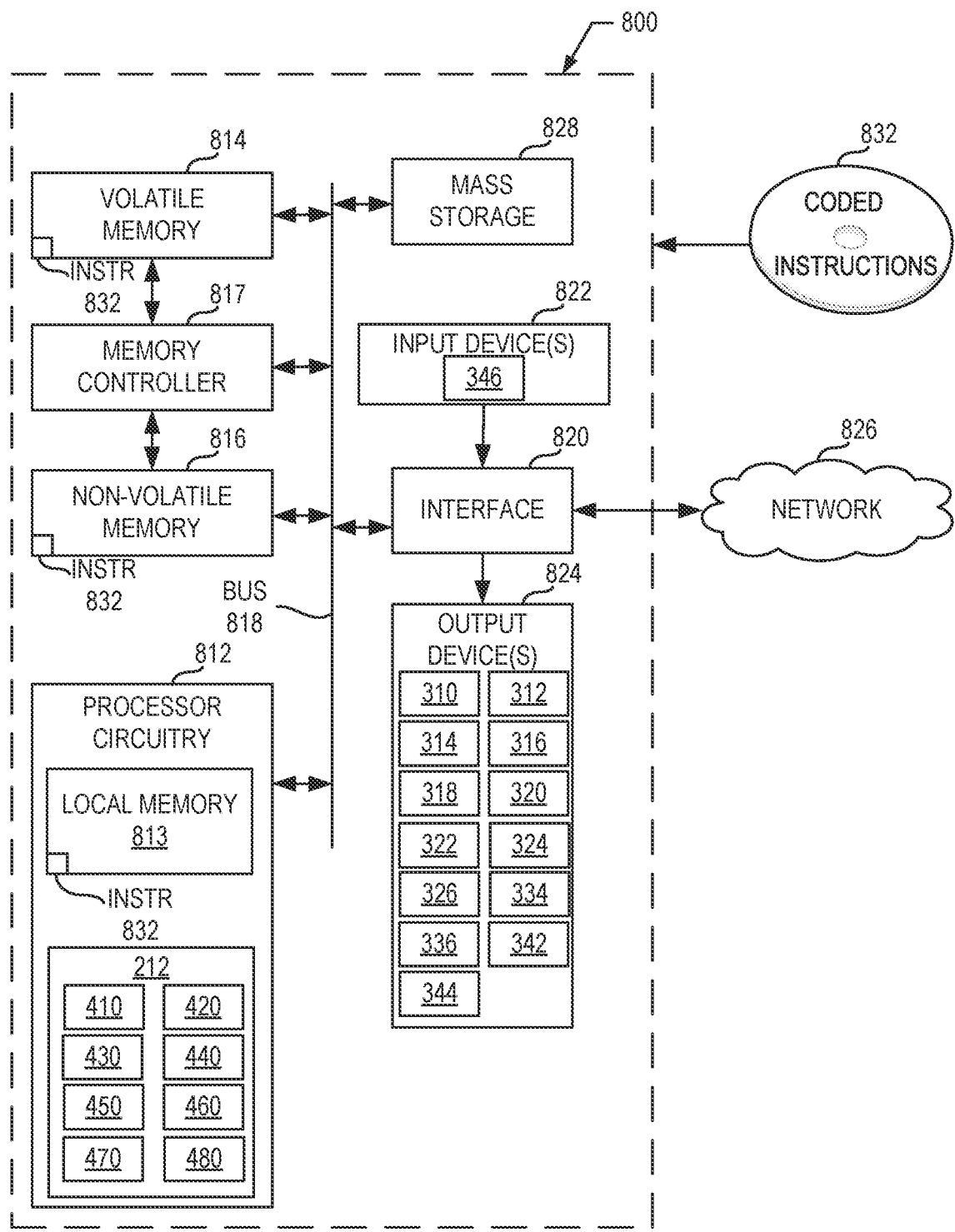
FIG. 8 is a block diagram of an example processing platform including processor circuitry structured to execute the example machine readable instructions of FIGS. 5-7 to implement the fuel line circuitry of FIG. 4.

FIG. 8 is a block diagram of an example processor platform 800 structured to execute and/or instantiate the machine readable instructions and/or operations of FIGS. 5, 6, and 7 to implement the fuel controlling circuitry 212 of FIGS. 2 and 4. The processor platform 800 can be, for example, a server, a personal computer, a workstation, a self-learning machine (e.g., a neural network), or any other type of computing device.

The processor platform 800 of the illustrated example includes processor circuitry 812. The processor circuitry 812 of the illustrated example is hardware. For example, the processor circuitry 812 can be implemented by one or more integrated circuits, logic circuits, FPGAs microprocessors, CPUs, GPUs, DSPs, and/or microcontrollers from any desired family or manufacturer. The processor circuitry 812 may be implemented by one or more semiconductor based (e.g., silicon based) devices. In this example, the processor circuitry 812 implements the fuel controlling circuitry 212 depicted in FIG. 4 including the valve controlling circuitry 410, the pump controlling circuitry 420, the trim vaporizer controlling circuitry 430, the engine output determining circuitry 440, the thermal energy determining circuitry 450, the nozzle flow determining circuitry 460, the fuel circuit processing circuitry 470, and the ignition controlling circuitry 480.

The processor circuitry 812 of the illustrated example includes a local memory 813 (e.g., a cache, registers, etc.). The processor circuitry 812 of the illustrated example is in communication with a main memory including a volatile memory 814 and a non-volatile memory 816 by a bus 818. The volatile memory 814 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 816 may be implemented by flash memory and/or any other desired type of memory device. Access to the main memory 814, 816 of the illustrated example is controlled by a memory controller 817.

The processor platform 800 of the illustrated example also includes interface circuitry 820. The interface circuitry 820 may be implemented by hardware in accordance with any type of interface standard, such as an Ethernet interface, a universal serial bus (USB) interface, a Bluetooth® interface, a near field communication (NFC) interface, a peripheral component interconnect (PCI) interface, and/or a PCIe interface.

In the illustrated example, one or more input devices 822 are connected to the interface circuitry 820. The input device(s) 822 permit(s) a user to enter data and/or commands into the processor circuitry 812. The input device(s) 822 can be implemented by, for example, one or more temperature sensors, motion sensors, position sensors, flow rate sensors, and/or gas composition sensors. In this example, the input device(s) 822 includes the sensors 346.

One or more output devices 824 are also connected to the interface circuitry 820 of the illustrated example. The output devices 824 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a speaker, an actuator, actively powered (e.g., commanded) valves, pumps (e.g., cryopumps, positive displacement pumps, centripetal pumps, multi-stage centripetal pumps, etc.), and/or heat exchangers (e.g., trim heaters, trim vaporizers, etc.). The interface circuitry 820 of the illustrated example, thus, typically includes a graphics driver card, a graphics driver chip, and/or graphics processor circuitry such as a GPU. In this example, the output device(s) implements the valves 310, 312, 314, 316, 318, 320, 322, 324, 326, the pumps 334, 336, and the trim vaporizers 342, 344.

The interface circuitry 820 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 826. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 800 of the illustrated example also includes one or more mass storage devices 828 to store software and/or data. Examples of such mass storage devices 828 include magnetic storage devices, optical storage devices, floppy disk drives, HDDs, CDs, Blu-ray disk drives, redundant array of independent disks (RAID) systems, solid state storage devices such as flash memory devices, and DVD drives.

The machine executable instructions 832, which may be implemented by the machine readable instructions of FIGS. 5, 6, and 7, may be stored in the mass storage device 828, in the volatile memory 814, in the non-volatile memory 816, and/or on a removable non-transitory computer readable storage medium such as a CD or DVD.

From the foregoing, it will be appreciated that example systems, methods, apparatus, and articles of manufacture have been disclosed that utilize hydrogen to produce propulsion in a gas turbine engine. More specifically, the examples described herein enable a gas turbine engine to produce propulsion while utilizing solely hydrogen as fuel to increase an efficiency of the gas turbine engine and produce less carbon emissions. Further, the examples described herein enable a fuel circuit to be primed and purged to mitigate the risks associated with the utilization of hydrogen as fuel, such as combustion flashback and/or flame holding. Examples disclosed herein utilize a heat exchanger(s) to warm up gaseous hydrogen, which then flows through and warms up a colder portion of the fuel circuit that previously included hydrogen at cryogenic temperatures. In turn, the warmed up gaseous hydrogen increases a temperature of the colder portion of the fuel circuit to enable inert gas to flow through and purge the fuel circuit without freezing. Further, examples described herein mix inert gas with hydrogen to increase an exit velocity of the hydrogen out of the combustor nozzles, which produces a larger separation between the hydrogen particles and the combustor nozzles in advance of the hydrogen particles combusting. As a result, the combustor nozzles avoid damage from the high combustion temperature hydrogen. Additionally, examples disclosed herein enable a fuel switch from a gaseous hydrogen supply to a cryogenic hydrogen supply when the inert gas clears the fuel circuit, which can prevent the gas turbine engine from overheating despite the high combustion temperature of hydrogen.

Example methods and apparatus to produce hydrogen gas turbine propulsion are disclosed herein. Further examples and combinations thereof include the following:

An apparatus to produce propulsion in a gas turbine engine comprising a fluid line to transport hydrogen from a hydrogen supply and an inert gas from an inert gas supply to a gas turbine combustor, and at least one heat exchanger coupled to the fluid line to heat the inert gas and the hydrogen in the fluid line.

The apparatus of any preceding clause, wherein the at least one heat exchanger is a trim vaporizer.

The apparatus of any preceding clause, wherein the hydrogen supply is a first hydrogen supply and the hydrogen is first hydrogen, wherein the fluid line is to transport second hydrogen from a second hydrogen supply, further including a pump to drive the second hydrogen through the fluid line.

The apparatus of any preceding clause, wherein the pump is a centripetal pump or a positive displacement pump.

The apparatus of any preceding clause, further including fuel controlling circuitry to cause the second hydrogen to move through the pump in response to a composition of the inert gas in the fluid line satisfying a threshold.

The apparatus of any preceding clause, wherein the second hydrogen is in a liquid state in a first portion of the fluid line and a gaseous state in a second portion of the fluid line, the second portion of the fluid line between the first portion of the fluid line and the gas turbine combustor.

The apparatus of any preceding clause, further including fuel controlling circuitry to de-activate the at least one heat exchanger in response to a temperature or a power output of the gas turbine engine satisfying a temperature threshold or a power output threshold.

The apparatus of any preceding clause, wherein the fluid line is to receive heat from the gas turbine engine when the at least one heat exchanger is deactivated.

The apparatus of any preceding clause, wherein the inert gas is not within the fluid line when the at least one heat exchanger is de-activated.

The apparatus of any preceding clause, further including a filter in the fluid line to prevent solid material from entering a portion of the fluid line.

The apparatus of any preceding clause, further including fuel controlling circuitry to cause the hydrogen to ignite in the gas turbine combustor in response to a flow rate of the hydrogen and the inert gas satisfying a threshold.

A non-transitory machine executable medium comprising instructions that, when executed, cause one or more processors to activate at least one heat exchanger to provide thermal energy to a fuel circuit fluidly coupled to a combustor, inject an inert gas into the fuel circuit in response to a temperature of the fuel circuit satisfying a temperature threshold, and inject hydrogen through the fuel circuit.

The non-transitory machine executable medium of any preceding clause, wherein the hydrogen mixes with the inert gas in the fuel circuit to increase a volume of gas in the fuel circuit.

The non-transitory machine executable medium of any preceding clause, wherein the hydrogen causes the inert gas to exit the fuel circuit.

The non-transitory machine executable medium of any preceding clause, wherein the hydrogen causes the inert gas to exit the fuel circuit in response to a power output of the gas turbine engine satisfying a power output threshold.

The non-transitory machine executable medium of any preceding clause, wherein the hydrogen is first hydrogen injected from a first hydrogen supply, wherein the instructions, when executed, cause the one or more processors to inject second hydrogen from a second hydrogen supply through the fuel circuit in response to the first hydrogen causing the inert gas to exit at least a portion of the fuel circuit.

The non-transitory machine executable medium of any preceding clause, wherein the first hydrogen is injected in a gaseous form and the second hydrogen is injected in a liquid from, the second hydrogen to convert from the liquid form to the gaseous form in the fuel circuit.

The non-transitory machine executable medium of any preceding clause, wherein the instructions, when executed, cause the one or more processors to cause the hydrogen to combust in the combustor in response to a flow rate of the hydrogen satisfying a flow rate threshold.

The non-transitory machine executable medium of any preceding clause, wherein the instructions, when executed, cause the one or more processors to de-activate the at least one heat exchanger in response to a temperature of at least a portion of the gas turbine engine satisfying a second temperature threshold, the second temperature threshold greater than the first temperature threshold.

The non-transitory machine executable medium of any preceding clause, wherein to shut down the gas turbine engine, the instructions, when executed, cause the one or more processors to at least partially activate the at least one heat exchanger, inject the hydrogen through the fuel circuit, inject the inert gas into the fuel circuit in response to a temperature of the fuel circuit satisfying the first temperature threshold, terminate injecting the hydrogen, the inert gas to cause the hydrogen to exit the fuel circuit, and trap the inert gas in the fuel circuit.

An apparatus to produce propulsion in a gas turbine engine comprising means for priming to provide thermal energy to a fuel circuit, means for purging the fuel circuit, the means for purging to receive the thermal energy from the means for priming, means for combusting to flow through the fuel circuit, wherein the fuel circuit is to include (i) the means for purging during a first operation of the gas turbine engine, (ii) the means for purging and the means for combusting during a second operation of the gas turbine engine, and (iii) the means for combusting during a third operation of the gas turbine engine.

A method to produce hydrogen propulsion in a turbofan engine comprising activating at least one heat exchanger to provide heat to a fuel circuit fluidly coupled to a combustor, injecting an inert gas into the fuel circuit, the inert gas affected by the at least one heat exchanger, and injecting hydrogen into the fuel circuit, the hydrogen affected by the at least one heat exchanger.

The method of any preceding clause, wherein the at least one heat exchanger includes at least one trim vaporizer.

The method of any preceding clause, wherein the inert gas is injected into the fuel circuit in response to a temperature of the fuel circuit satisfying a temperature threshold.

The method of any preceding clause, further including igniting the hydrogen in the combustor in response to the hydrogen satisfying a temperature threshold.

The method of any preceding clause, wherein blending the hydrogen with the inert gas includes increasing a volume of fluid in the fuel circuit to increase a velocity of the hydrogen exiting at least one nozzle into the combustor.

The method of any preceding clause, further including reducing a percentage composition of the inert gas in the fuel circuit in response to the turbofan engine satisfying a power output threshold, wherein the percentage composition of the inert gas in the fuel circuit is reduced to as low as 0%.

The method of any preceding clause, wherein injecting the hydrogen into the fuel circuit includes injecting the hydrogen from a first hydrogen source, further including injecting hydrogen into the fuel circuit from a second hydrogen source in response to the percentage composition of the inert gas in a portion of the fuel circuit being less than a composition threshold.

The method of any preceding clause, further including de-activating the at least one heat exchanger in response to the turbofan engine radiating thermal energy that satisfies a thermal energy threshold.

The method of any preceding clause, further including passing at least a portion of the hydrogen through a filter.

The method of any preceding clause, further including shutting down the turbofan engine including: when the at least one heat exchanger is de-activated, activating the at least one heat exchanger; injecting the hydrogen into the fuel circuit, the hydrogen affected by the at least one heat exchanger; and injecting the inert gas into the fuel circuit in response to the hydrogen in the fuel circuit satisfying a temperature threshold, wherein the inert gas causes the hydrogen to move out of the fuel circuit.

The method of any preceding clause, further including closing one or more valves to trap the inert gas in the fuel circuit in response to the hydrogen being moved out of the fuel circuit.

A method to produce propulsion in a turbofan engine comprising heating an inert gas in a fuel circuit fluidly coupled to a gas turbine combustor, and injecting hydrogen into the fuel circuit from a hydrogen source.

The method of any preceding clause, further including injecting the inert gas into the fuel circuit, the inert gas to form a blend with the hydrogen in the fuel circuit.

The method of any preceding clause, further including igniting the hydrogen in the gas turbine combustor in response to the blend satisfying a mass flow rate threshold.

The method of any preceding clause, further including closing a valve to stop the inert gas from being injected into the fuel circuit in response to an output of the turbofan engine satisfying a threshold.

The method of any preceding clause, wherein the hydrogen is a first hydrogen source, further including injecting the hydrogen into the fuel circuit from a second hydrogen source in response to the inert gas being moved out of at least a portion of the fuel circuit.

The method of any preceding clause, further including heating the fuel circuit via at least one trim vaporizer in response to a temperature of the turbofan engine not satisfying a threshold, and heating the fuel circuit via the turbofan engine in response the temperature of the turbofan engine satisfying the threshold.

Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

The following claims are hereby incorporated into this Detailed Description by this reference, with each claim standing on its own as a separate embodiment of the present disclosure.

What is claimed is:

1. A fuel system comprising:
   a gaseous hydrogen supply;
   a cryogenic hydrogen supply;
   a first heat exchanger to heat first hydrogen fuel from the gaseous hydrogen supply and not second hydrogen fuel from the cryogenic hydrogen supply; and
   a second heat exchanger to heat the first hydrogen fuel and the second hydrogen fuel.

2. The fuel system of claim 1, further including a third heat exchanger to heat the first hydrogen fuel and the second hydrogen fuel.

3. The fuel system of claim 2, wherein the first hydrogen fuel and the second hydrogen fuel receive heat from an associated engine in the third heat exchanger.

4. The fuel system of claim 2, further including a valve between at least a portion of the third heat exchanger and the second heat exchanger, wherein the valve enables at least one of the first hydrogen fuel or the second hydrogen fuel to escape the fuel system in response to encountering a pressure greater than a pressure threshold.

5. The fuel system of claim 1, wherein at least one of the first heat exchanger or the second heat exchanger is a trim vaporizer.

6. The fuel system of claim 1, wherein at least one of the first heat exchanger or the second heat exchanger is deactivated in response to a temperature in at least a portion of an associated engine satisfying a temperature threshold.

7. The fuel system of claim 1, wherein at least one of the first heat exchanger or the second heat exchanger is deactivated in response to a power output of an associated engine satisfying a power output threshold.

8. The fuel system of claim 1, wherein the first heat exchanger and the second heat exchanger heat an inert gas.

9. The fuel system of claim 1, further including an accumulator downstream of the first heat exchanger and the second heat exchanger.

10. A fuel system comprising:
a fuel circuit;
a first hydrogen supply coupled to the fuel circuit;
a second hydrogen supply coupled to the fuel circuit;
a first heat exchanger coupled to the fuel circuit downstream of the first hydrogen supply and not the second hydrogen supply, wherein the first heat exchanger heats a portion of the fuel circuit that carries inert gas to a temperature that is greater than a liquification temperature of the inert gas; and
a second heat exchanger coupled to the fuel circuit downstream of the first hydrogen supply and the second hydrogen supply.

11. The fuel system of claim 10, further including a third heat exchanger coupled to the fuel circuit downstream of the first hydrogen supply and the second hydrogen supply.

12. The fuel system of claim 11, wherein fuel from the first hydrogen supply or the second hydrogen supply receives heat from an engine in the third heat exchanger or the second heat exchanger.

13. The fuel system of claim 11, further including a valve coupled to the fuel circuit between the third heat exchanger and the second heat exchanger, wherein the valve enables fuel to escape the fuel system in response to encountering a pressure greater than a pressure threshold.

14. The fuel system of claim 10, wherein at least one of the first heat exchanger or the second heat exchanger is deactivated in response to a temperature in at least a portion of an associated engine satisfying a temperature threshold.

15. The fuel system of claim 14, wherein at least one of the first heat exchanger or the second heat exchanger is reactivated during a shutdown of an engine associated with the fuel system.

16. The fuel system of claim 10, further including a purge gas supply coupled to the fuel circuit, wherein the first heat exchanger and the second heat exchanger are positioned downstream of the purge gas supply.

17. A method comprising:
heating first hydrogen from a gaseous hydrogen supply via a first heat exchanger and a second heat exchanger;
heating second hydrogen from a cryogenic hydrogen supply via the first heat exchanger and not the second heat exchanger; and
injecting the first hydrogen and the second hydrogen into a combustor of an engine.

18. The method of claim 17, further including heating the second hydrogen via a third heat exchanger.

19. The method of claim 17, further including deactivating at least one of the first heat exchanger or the second heat exchanger in response to (i) a temperature in at least a portion of the engine satisfying a temperature threshold or (ii) a power output of the engine satisfying a power output threshold.

20. The method of claim 17, further including heating an inert gas via the first heat exchanger and the second heat exchanger.

* * * * *